US006990592B2

(12) United States Patent
Richmond et al.

(10) Patent No.: US 6,990,592 B2
(45) Date of Patent: *Jan. 24, 2006

(54) CONTROLLING CONCURRENT USAGE OF NETWORK RESOURCES BY MULTIPLE USERS AT AN ENTRY POINT TO A COMMUNICATIONS NETWORK BASED ON IDENTITIES OF THE USERS

(75) Inventors: James Richmond, Newfields, NH (US); David L. Kjendal, Newmarket, NH (US)

(73) Assignee: Enterasys Networks, Inc., Andover, MA (US)

( * ) Notice: Subject to any disclaimer, the term of this patent is extended or adjusted under 35 U.S.C. 154(b) by 281 days.

This patent is subject to a terminal disclaimer.

(21) Appl. No.: 10/251,140

(22) Filed: Sep. 20, 2002

(65) Prior Publication Data

US 2003/0152067 A1    Aug. 14, 2003

Related U.S. Application Data

(63) Continuation-in-part of application No. 10/071,873, filed on Feb. 8, 2002, now Pat. No. 6,892,309.

(51) Int. Cl.
*H04L 9/00* (2006.01)
*G06F 15/16* (2006.01)
(52) U.S. Cl. ................ 713/201; 709/226; 709/229
(58) Field of Classification Search ........ 713/200–202; 709/223–229
See application file for complete search history.

(56) References Cited

U.S. PATENT DOCUMENTS 5,889,953 A    3/1999    Thebaut et al.

(Continued)

OTHER PUBLICATIONS

Michael L. DeRosia, et al. "Firewalls", ISMG 4700, Data Communications, Dec. 7, 2000.

(Continued)

*Primary Examiner*—Christopher Revak
(74) *Attorney, Agent, or Firm*—Lahive & Cockfield, LLP; David R. Burns, Esq.

(57) ABSTRACT

Controlling a user's usage of network resources, after the user has been authenticated, without using any network resources beyond the user's entry point to the network. A plurality of users may be connected to an entry point of a network of a network device by a shared transmission medium. Each users' usage of network resources is controlled, after such user has been authenticated, without using any network resources beyond such user's entry point to the network. For each one or more users, packet rules may be provisioned to the user's entry point to the network, where such entry point may be shared with other users. The packet rules may be applied to each packet received from the user before any network resources beyond the entry point are used. These packet rules may be associated with an identity of the user and then provisioned to the user's entry point in response to the user being authenticated. If a plurality of users are connected to an entry point by a shared transmission medium, packet rules associated with the users may be provisioned to the entry point and applied to packets received from the users before any network resources beyond the entry point are used. Such packet rules may be provisioned to a number of network entry devices and may serve as a distributed firewall for users of a network, as opposed to a centralized firewall. An entry port module of a network entry device may be configured based on an identity of one or more users as a result of the authentication of the one or more users, respectively, and each packet received from each user may be examined to control usage of network resources by the user.

25 Claims, 21 Drawing Sheets

U.S. PATENT DOCUMENTS

| | | | |
|---|---|---|---|
| 5,968,176 | A | 10/1999 | Nessett et al. |
| 6,134,662 | A | 10/2000 | Levy et al. |
| 6,182,226 | B1 | 1/2001 | Reid et al. |
| 6,212,633 | B1 | 4/2001 | Levy et al. |
| 2003/0084331 | A1 | 5/2003 | Dixon et al. |
| 2003/0118038 | A1 | 6/2003 | Jalava et al. |

OTHER PUBLICATIONS

Steven Pettit, "enterasys User Personalized Network", pp. 1-16, Enterasys Networks' White Paper, Feb. 12, 2001.

J.P. Gorsky, "Layer Feb. 3, 2004 Frame Classification Primer", pp. 1-4, Enterasys Networks' White Paper; pp. 1-4, May 1999.

Keith Schultz, "A Complete Solution," Internet Week, Jan. 22, 2001, pp. 1-4.

Business Wire, "Enterasys Networks' Unveils the Industry's First User Personalized Network," Feb. 12, 2001, pp. 1-2.

Phil Hochmuth, "Enterasys Brings Policy Enforcement Closer to Users," Network World, Feb. 12, 2001, pp. 1-2.

Paul Congdon, Hewlett Packard, IEEE 802.1X Overview, "Port Based Network Access Control", IEEE Plenary, Alburquerque, NM, Mar. 2000.

FIG. 5

| NAME | STATUS | TYPE | VALVE | MASK | VLAN | PRIORITY | DENY? | RATE LIMIT | LAYER |
|---|---|---|---|---|---|---|---|---|---|
| CONTAIN SUBNET 54 | ENABLED | IP ADDRESS BILATERAL | 10.20.54.0 | 255.255.255.0 | 5 | 7 | NO | NONE | 3 |

FIG. 6

| NAME | RULE 1 | RULE 2 | RULE 3 | RULE 4 |
|---|---|---|---|---|
| CONTAIN IP ENG SUBNET TRAFFIC | CONTAIN SUBNET 54 | CONTAIN SUBNET 55 | CONTAIN SUBNET 56 | CONTAIN SUBNET 57 |

FIG. 7

| NAME | DEFAULT VLAN | DEFAULT PRIORITY | SERVICE 1 | SERVICE 2 | SERVICE 3 | ... |
|---|---|---|---|---|---|---|
| ENGINEERING | 5 | NONE | CONTAIN DHCP | CONTAIN ICMP | CONTAIN IP ENG SUBNET TRAFFIC | |

Edit Rule

Layer

Traffic Classification Layer:

Layer 3 – Network ▽

Type

Traffic Classification Type:

IP Address Bilateral ▽

Value

IP Address Bilateral

Enter a valid IP Address in the text box below (XXX.XXX.XXX.XXX)
Select a Mask from the choice box below Value: 10.20.54.0
Mask: 255.255.255.0 ▽

[OK] [Apply] [Cancel] [Help]

*FIG. 8*

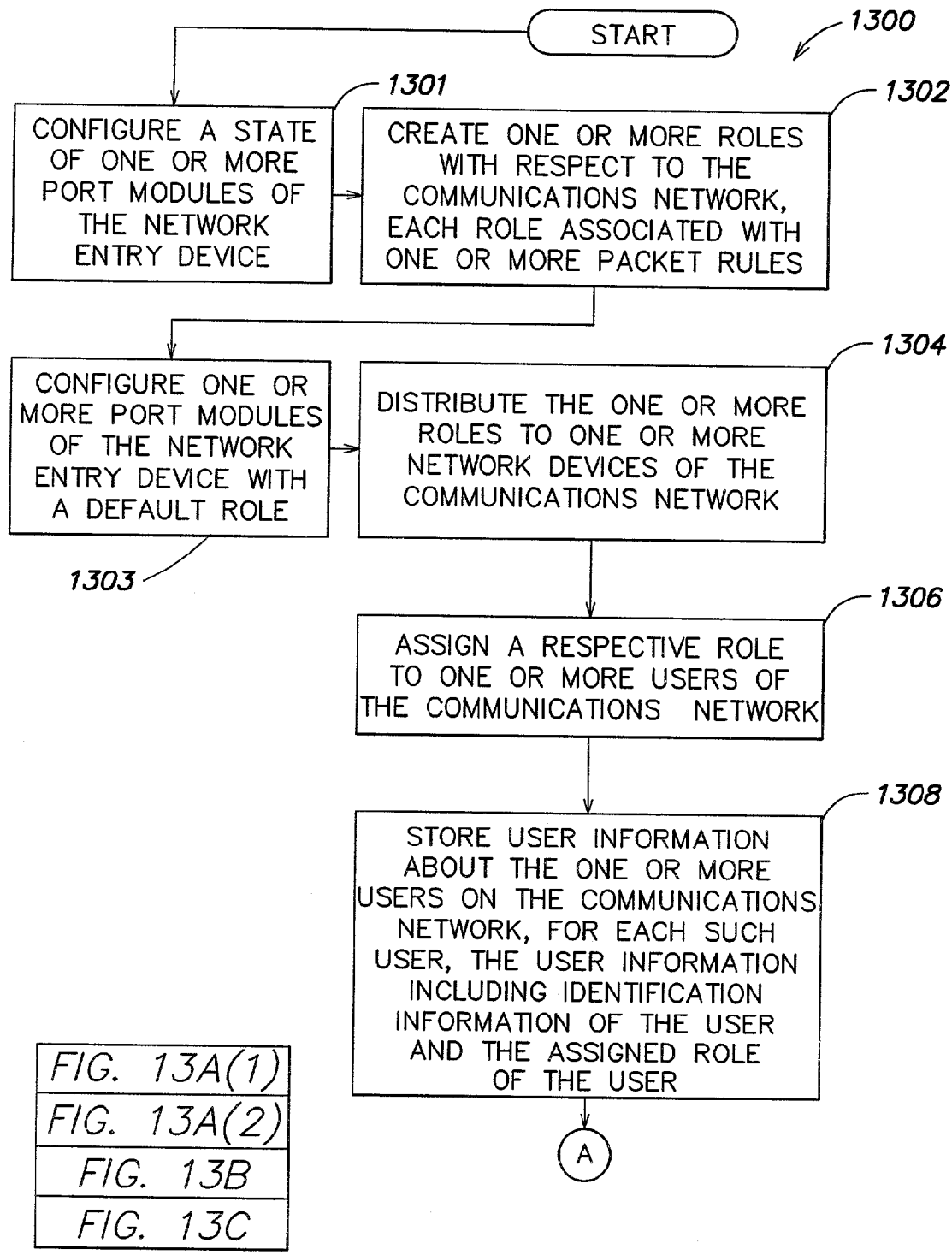

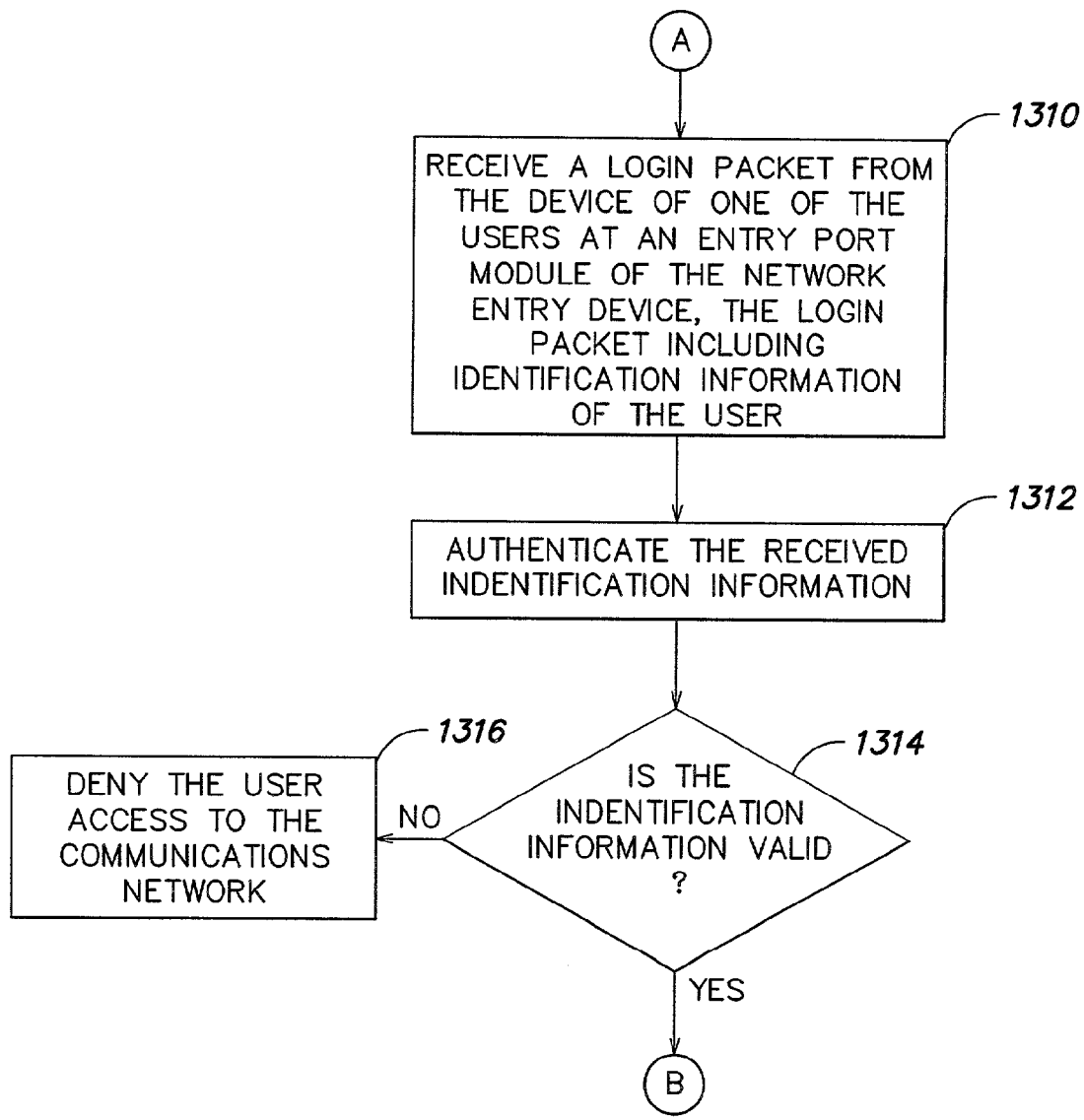
FIG. 13A(2)

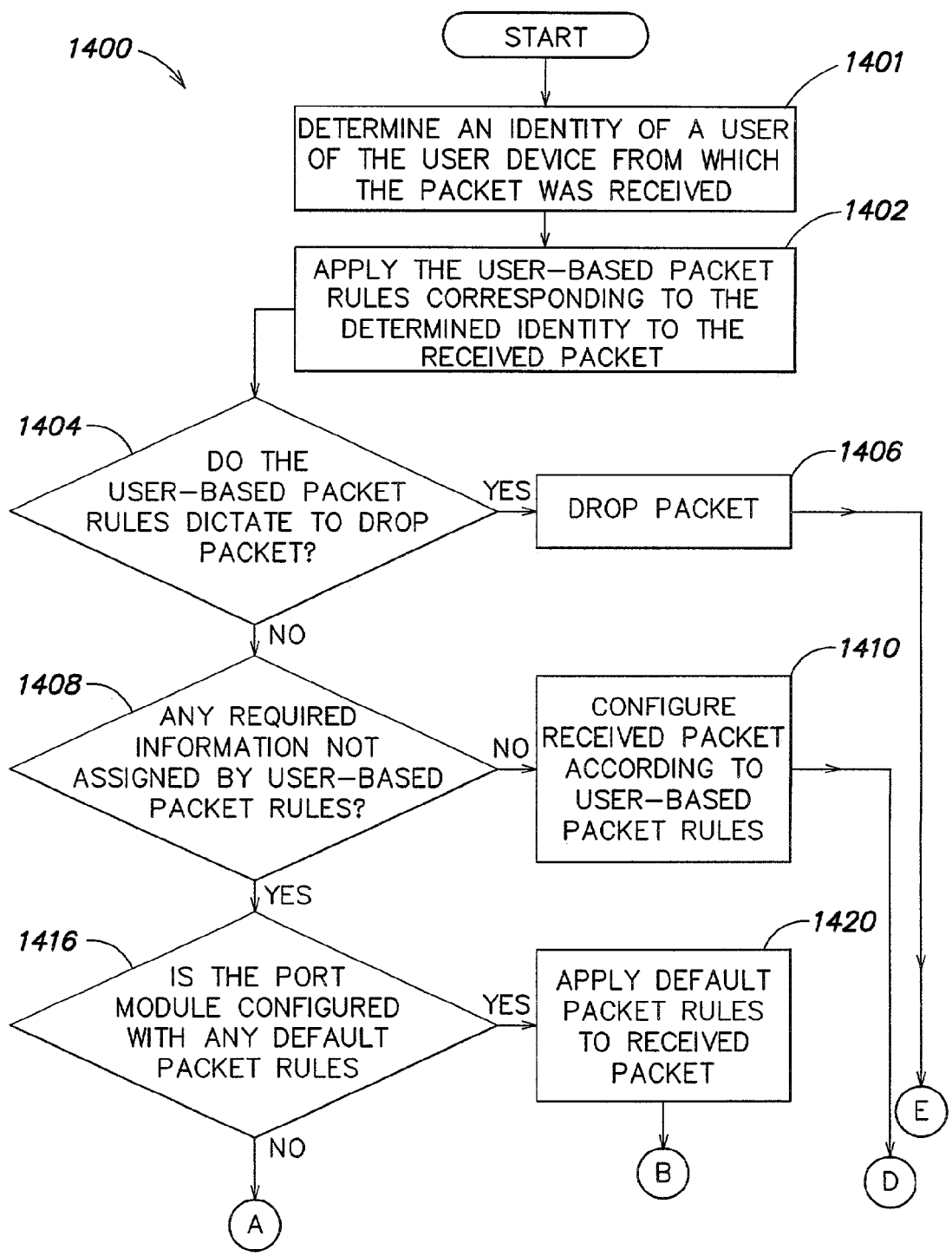
FIG. 14A(1)

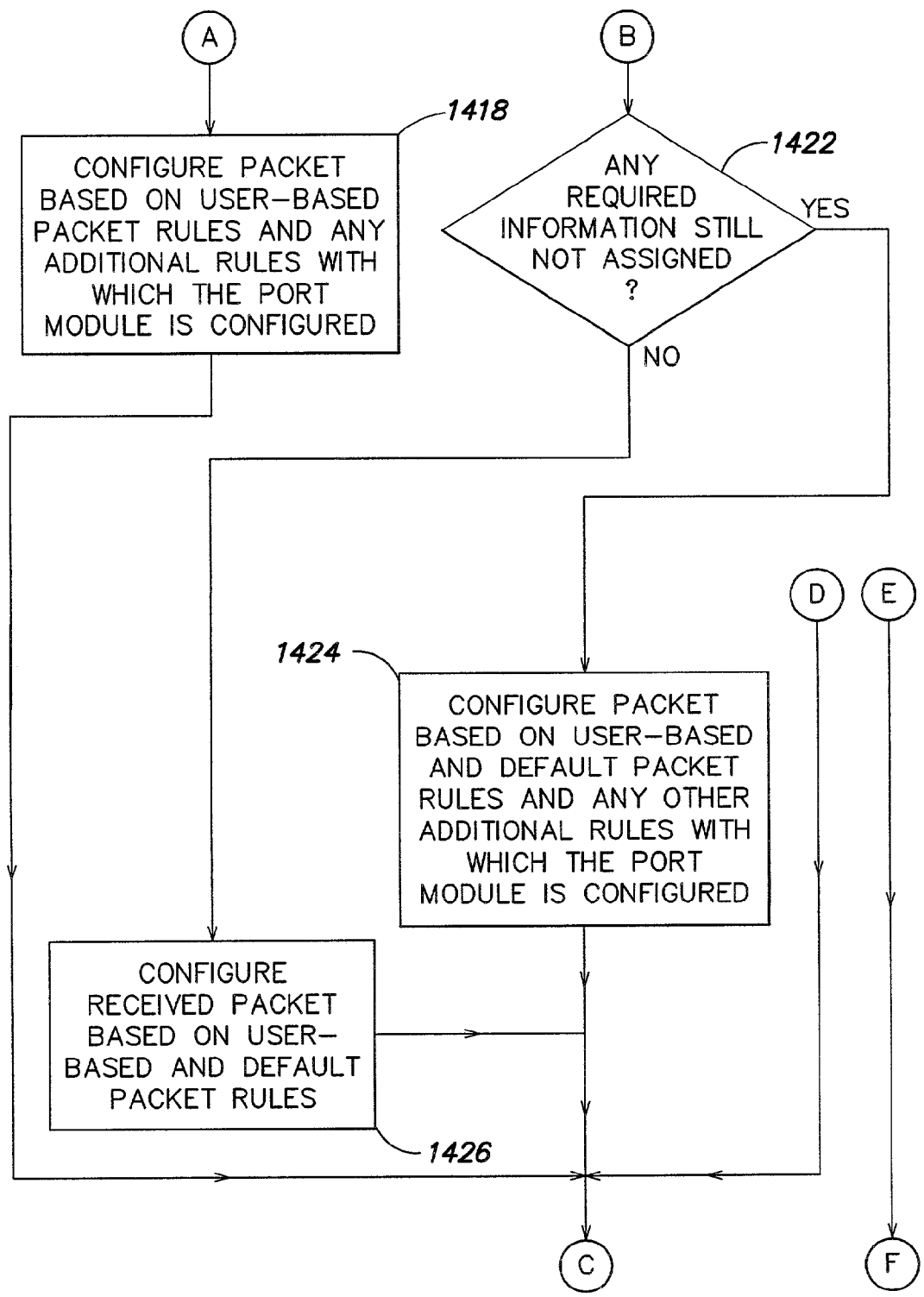
FIG. 14A(2)

CONTROLLING CONCURRENT USAGE OF NETWORK RESOURCES BY MULTIPLE USERS AT AN ENTRY POINT TO A COMMUNICATIONS NETWORK BASED ON IDENTITIES OF THE USERS

RELATED APPLICATIONS

This application is a Continuation-In-Part of U.S. application Ser. No. 10/071,873, filed Feb. 8, 2002 now U.S. Pat. No. 6,892,309, and entitled CONTROLLING USAGE OF NETWORK RESOURCES BY A USER AT THE USER'S ENTRY POINT TO A COMMUNICATIONS NETWORK BASED ON AN IDENTITY OF THE USER, which is hereby incorporated by reference in its entirety.

Commonly-owned U.S. Pat. No. 6,892,309, CREATING, MODIFYING AND STORING SERVICE ABSTRACTIONS AND ROLE ABSTRACTIONS REPRESENTING ONE OR MORE PACKET RULES, filed on Feb. 8, 2002, is hereby incorporated by reference in its entirety.

BACKGROUND

Communications networks continue to grow and improve in today's world. A common issue in such networks is how to control usage of network resources by users.

As used herein, a "network" or a "communications network" is group of two or more devices interconnected by one or more segments of transmission media on which information may be exchanged between the devices. There are a variety of types of networks, including, but not limited to, telecommunications networks, data communications networks and combinations thereof. As used herein, a "network device" is a device configured as part of a network, and the terms "comprising", "including", "carrying", "having", "containing", "involving", and the like are to be understood to be open-ended, i.e., to mean including but not limited to.

As used herein, a "network resource" is a resource included as part of a communications network, including network devices, information stored on the network devices and bandwidth available on the transmission medium or mediums of the network. Such network devices may be and/or include any of a variety of types of devices, including, among other things, switching devices, workstations, personal computers, terminals, laptop computers, end stations, servers, gateways, registers, directories, databases, printers, fax machines, telephones, transmitters, receivers, repeaters, and any combinations thereof. Such transmission mediums may be any of a variety of types of mediums, including, but not limited to, electrical cables or wires, fiber optic cables, and air, on which carrier waves are transmitted.

As used herein, a "switching device" is a device that serves as an interface between a plurality of transmission mediums, for example, two or more electrical cables or wires, two or more fiber optic cables, two or more carrier waves or two or more of any combination thereof. As used herein, "plurality" means two or more.

Typically, a switching device is part of a network and has a plurality of physical ports, wherein at least one of the physical ports is operative to receive packets from a first transmission medium and at least one other of the physical ports is operative to transmit packets on a second transmission medium. Types of switching devices include, but are not limited to, switches, hubs, routers, and bridges. A general purpose computer may be configured to serve as a switching device.

As used herein, a "physical port" is a physical (e.g., hardware, firmware or combination thereof) component of a device that receives and/or transmits packets. As used herein, a "virtual port" is a logical module resident on a network device that represents a communication channel (e.g., a time slot or frequency channel) of communications received on a wireless transmission medium at a physical port. Thus, multiple virtual ports may be defined for a physical port that receives communications on a wireless transmission medium, where each virtual port represents a different communication channel corresponding to the physical port. Virtual ports are described in more detail below in relation to FIG. 15.

As used herein, a "logical port" is an abstraction representing an endpoint to a higher layer (e.g., transport or application layer) logical connection on a device. A port number for a logical port may represent the type of the logical port in accordance with a standard or protocol. For example, port 80 is typically used to specify a logical port serving as an endpoint to an HyperText Transfer Protocol (HTTP) connection.

Controlling usage of network resources may include, but is not limited to: denying one or more packets access to any network resources beyond a network device (i.e., dropping the packet); regulating bandwidth on the network consumed by packets received from the user, for example, by assigning priorities to received packets or applying rate limiting to received packets; denying access to certain network resources, for example, by assigning a Virtual Local Area Network (VLAN) to the packet; and routing the packet. VLANs are described in more detail in IEEE 802.1Q: *IEEE Standards for Local and Metropolitan Area Networks: Virtual Bridged Local Area Networks*, Dec. 8, 1998, the entire contents of which are hereby incorporated by reference. Assigning a VLAN to a packet and/or assigning a priority to a packet, may be referred to herein as "classifying" a packet. As used herein, a "packet" is a unit of communication exchanged between devices.

FIG. 1 is a block diagram illustrating an example of a communications network 100. Network 100 may include one or more interconnected Local Area Networks (LANs), Metropolitan Area Networks (MANs), or combinations thereof. Further, network 100 may serve as a communications network for a business organization or other type of enterprise, and as such may be considered an "enterprise" network.

Network 100 may include a plurality of devices of varying type, including any of network entry devices 114, 116, 120, 124 and 144, printer 122, fax machine 123, application server 134, switching device 136, device 138 and authentication server 142. Switching device 136 may be configured as a core switching device that serves as a more centralized switching device for network 100 than the network entry devices.

A network entry device may include one or more port modules, and one or more of these port modules may be an entry port module.

As used herein, a "port module" of a switching device includes a physical port of the device and port processing logic associated with the physical port. Such port processing logic may include switching logic, memory, and one or more processors for configuring the port module and for processing packets sent to and received at the port module. Such port processing logic may be divided into one or more virtual ports, each virtual port corresponding to a communication channel of the physical port. The port processing logic may include separate switching logic, memory and processors for each virtual port or may share such components between one or more virtual ports. Further, the switching logic, memory and processors of a port module may be shared with several other port modules. A port module may be implemented as part of a port interface card (PIC), which may include one or more port modules.

As used herein, an "entry port" is a physical port of a network device that serves as a user's entry point into a network. Thus, to communicate with devices on the network, a user's device may transmit one or more packets to an entry port. Further, as used herein, an "entry port module" is a port module of a network device that includes an entry port.

As used herein, a "network entry device" is a network device that includes at least one entry port module. Thus, from the perspective of other devices, a network entry device serves as an entry point to the network for at least one user. A network entry device may reside at an edge or boundary of the communications network and provide connectivity between network resources of the communications network and devices located external to the communications network. Such network entry device may be any of a variety of types of devices, for example, a switching device.

As used herein, a "user device" is a device used by a user of a communications network to perform at least one of the following: receive a packet from the network and send a packet to the network. Types of user devices may include, but are not limited to, workstations, terminals, personal computers, laptops, telephones, pagers, BlackBerry™ brand devices, and personal digital assistants (PDAs).

An entry port module may be coupled to a user device by a shared transmission medium or a dedicated transmission medium. As used herein, a "shared transmission medium" is a transmission medium connected to a port module of a first device and over which multiple other devices may exchange packets with the first device. For example, a gateway server for an enterprise network may have a port module connected to the Internet by a T-3 cable, over which several users of the enterprise network may exchange packets with the Internet. Another example is an Ethernet cable connected to multiple user devices of a LAN.

In contrast to a shared transmission medium, a dedicated transmission medium is a transmission medium that is connected to a port module of a first device at one end over which only one other device may exchange packets. For example, a user device may be directly-coupled to a switching device by a dedicated transmission medium.

As used herein, two devices are "directly-coupled" if no intervening device is communicatively disposed between the two devices that, for packets exchanged between the two devices, is operative to change the content of such packets or to make decisions regarding forwarding such packets. For example, two devices are directly-coupled if they are connected by: a single segment of transmission medium (e.g., fiber optic cable, electrical cable or air) and no device is communicatively disposed between the two devices; two or more serially-connected segments of transmission medium connected by one or more repeaters; and two or more serially-connected segments of transmission medium connected by one or more transceiver pairs. An example of two devices that are not directly-coupled would include two devices with a switch communicatively disposed between them.

Referring to FIG. 1, network entry device 114 may include an entry port module 108 that is connected to user devices 102 and 104 by a shared wire-based transmission medium 106. As used herein, a "wire-based transmission medium" is a transmission medium that is not a wireless transmission medium (e.g., air), for example, an optical cable or an electrical wire or cable. Accordingly, a "shared wire-based transmission medium" is a wire-based transmission medium that connects two or more devices.

Entry port module 113 of network entry device 114 may be connected to user device 110 by a dedicated wire-based transmission medium 112.

Entry port module 118 of network entry device 116 is connected to user devices by a shared wireless (i.e., air) transmission medium 119, which by nature is a shared transmission medium. Multiple user devices may concurrently exchange packets with the entry port module 118, using communication channels that share the transmission medium using known or later developed multiplexing schemes (e.g., time division, frequency division, code division, or combinations thereof). Accordingly, port module 118 may include a plurality of virtual ports, each virtual port corresponding to one of the communication channels. It should be noted that such multiplexing schemes, as well as others such as space division multiplexing, may be used on any port module (e.g., 108, 118 and 146) on which multiple users share a transmission medium.

Entry port module 146 of network entry device 144 is connected to user device 150 by the Internet 148 and shared transmission medium 152.

Entry port modules 126, 128 and 130 of network entry device 124 may be connected to user device 133 by a Public Switched Telephone Network (PSTN) 132 and by shared transmission mediums 154. Although transmission mediums 154 are shared, any of ports 126, 128 and 130 may be configured along with devices to which they are coupled on the PSTN to make any of transmission mediums 154 dedicated to user device 133 for the duration of a session, such as a telephone call during which data is exchanged.

Any of the network entry devices 114, 116, 124 and 144 may be coupled by different port modules to both shared and dedicated transmission mediums as well as wire-based and wireless transmission mediums.

One technique used to control usage of network resources is to apply user authentication to restrict access to network resources. Technologies that employ user authentication techniques include, among others, network operating systems (NOSs) (e.g., Netware by Novell and Windows NT), Remote Authentication Dial-In User Service (RADIUS) and IEEE 802.1X: *Port Based Network Access Control*, 2001. RADIUS is described in Request For Comments (RFC) 2138, entitled *Remote Authentication Dial In User Service (RADIUS)* by C. Rigney et al., promulgated by the Internet Engineering Task Force (IETF), published April, 1997, and available as of the date of this filing at: http://www.ietf.org/rfc/rfc2138.txt? number=2138., the entire contents of which are hereby incorporated by reference. IEEE 802.1X, the entire contents of which are hereby incorporated by reference, defines a standard for providing port-based network access control on a Media Access Control (MAC) bridge.

Typically, such authentication technologies require a user to initially log-in to a network, for example, by entering a username, password and possibly other credentials, before having access to information stored on the network. Logging in may include exchanging packets between a device of the user (e.g., user device 102, 104, 110, 133 or 150) and one or more network devices (e.g., switching device 136 and authentication server 142), and these packets may be transmitted through a network device (e.g., 114, 116, 124 or 144) serving as the user's entry point in to the network.

After a user (e.g., 102) has successfully logged in, however, the user typically is free to use at least some network resources beyond the network device serving as the user's entry point (e.g., 114). For example, the user may be allowed to consume bandwidth and processing resources on switching devices (e.g., 136) to communicate with other devices on the network (e.g., application server 134), and allowed to access applications and information provided on the network.

Although some applications resident on network devices (e.g., application server 134) may require additional authentication of a user before providing the user access to certain information, the user still is allowed to use network resources beyond the user's entry point before the authentication is performed. Specifically, the user consumes bandwidth on transmission media between the user's device and the network device on which the application resides, consumes processing power on switching devices between the user device and the network device, and consumes processing power on the network device itself as it executes the application.

Another technique for controlling usage of network resources is based on network infrastructure. For example, a network topology may be configured such that there is no possible transmission path between two or more devices. Further, switching devices on the network may be configured to forward packets received at the switching device based on the physical port at which the packet was received. For example, a switching device may be configured not to allow a physical port to receive any packets, or to forward all packets received at one physical port to another physical port on the switching device, or to assign or append the same VLAN header to all packets received at a particular physical port. A VLAN header may include a VLAN identifier and a priority, for example, as described in more detail in IEEE 802.1Q.

Such techniques, however, do not take into consideration the identities of the users that transmitted the packets. Thus, controlling the usage of network resources cannot be based on the identities of those users. Accordingly, if a user accesses such communications network from a different port, possibly from even a different network device, the user may be permitted a different usage of network resources. This problem becomes more significant as the use of mobile user devices and the implementation of wireless networks becomes more prevalent, because users are more likely to access a network from a different point in such networks.

Another technique for controlling usage of network resources is to analyze information included in packets and forward the received packets based on the information. For example, some switching devices may be configured to examine information included in a received packet, for example, a source Media Access Control (MAC) address, a destination MAC address, or a protocol, and forward the packet or assign a VLAN header to the packet based on this information, for example, as described in more detail in IEEE 802.1Q. A switching device configured as such may serve as an entry point to the network for one or more users.

Such technique, however, does not take into consideration the identities of the users that transmit the packets, and, therefore, usage of network resources cannot be controlled at a switching device based on such identities.

Use of a firewall (e.g., firewall 140) is another example of a technique for controlling usage of network resources by analyzing information included in packets and forwarding the received packets based on the information. A firewall resident on a device (e.g., device 138) of a private network (e.g., 100) may include one or more programs configured to analyze packets transmitted from a device of an authorized user (e.g., user device 102 or 133) of the private network, and to determine whether and/or how much usage of resources external to the private network is allowed for the authorized user. For example, the authorized user may attempt to access a web page by transmitting a packet destined for the Internet (e.g., Internet 148). The firewall may be configured to intercept such packets and determine whether to allow the packets to proceed on to the Internet, or apply some form of rate limiting to limit the amount of bandwidth the user can use in communicating with the web site.

Such firewall may perform similar analysis to incoming packets from users (e.g., user 150) outside of the private network to control usage of resources of the private network. For example, the firewall may be configured to prevent unauthorized users from accessing network resources (e.g., screening emails from an outside user), and may be configured to establish a Virtual Private Network (VPN) across one or more publicly-accessible networks (e.g., the Internet) with a user device.

Similar to as described above for applications employing user authentication, a problem with typical firewalls is that users are allowed to use network resources beyond their respective entry points to the network before the firewall is ever enforced. Specifically, for each packet transmitted by a user, the user consumes bandwidth on transmission media between the network device serving as the user's entry point and the network device on which the firewall resides, consumes processing power on switching devices between the user device and the network device, and consumes processing power on the network device on which the firewall resides while executing the programs of the firewall.

Thus, although several techniques are known for controlling usage of network resources by a user, none of these known techniques are capable of controlling usage of network resources by a user, after the user has been authenticated, based on an identity of the user, without using any of the network resources beyond the user's entry point.

Another problem with typical communications networks is that network administrators may have to administer the configuration of the network at a relatively advanced technological level. For example, although a network administrator may be more concerned with higher level network issues such as implementing a most efficient network topology or installing a network firewall, a network administrator may be bogged down in the details of defining rules for assigning VLANs to packets received at devices on the networks. Assigning such rules may require relatively advanced technical knowledge of the format of the packet and which field of the packet to examine to determine a VLAN. Besides not having the time for such low level detail, a network administrator may not have the technical skill to adequately address such low level detail.

Another problem with typical communications networks is that network administrators may have to administer the configuration of a network on a per instance or per element basis. Thus, network administrators may have to configure each switching device or each port of a switching device individually. Such administration is problematic, as it requires the network administrator to duplicate the steps involved in configuring a parameter repeatedly for each element of the network. For example, the network administrator may continuously implement seemingly unrelated instances of a rule for assigning a VLAN to packets without any understanding that: a) many of the rules have been used numerous times before, and will be used many times again, and b) groups of the rules are related to each other and may be deployed in concert to deliver a specified behavior.

SUMMARY

In an embodiment of the invention, a network device of a communications network is used to control usage of network resources of the communications network by a plurality of users, where the network device serves as an entry point to the communications network for the plurality of users and includes a port module. The port module is connected by a transmission medium to a first user device used by a first of the plurality of users and located externally to the communications network. The port module also is connected by the transmission medium to a second user device used by a second of the plurality of users and located externally to the communications network. The port module is configured with one or more packet rules, where at least a first of the one or more packet rules is associated with the identity of the first user and at least one of the packet rules is associated with the identity of the second user.

In an aspect of this embodiment, a first packet is received at the port module from a user device, and an identity of a user of the user device is determined. If the determined identity is the identity of the first user, then, before using any of the network resources beyond the network device in response to processing the first packet, at least the first rule is applied to the first packet. This process may be repeated for all packets received at the port module from the first user device until the first user logs off of the communications network.

In another aspect of this embodiment, if the determined identity is the identity of the second user, then, before using any of the network resources beyond the network device in response to processing the second packet, the at least one packet rule is applied to the second packet concurrently to the first user being logged on to the communications network.

In yet another aspect of this embodiment, the at least one packet rule is the first packet rule. In another aspect of this embodiment, the first packet rule is not associated with the second user and the at least one packet rule is not associated with the first user.

In another aspect of this embodiment, the identity of at least the first user is authenticated before the port module is configured with one or more packet rules, where the port module is configured with at least the first packet rule in response to the authentication.

In another aspect of this embodiment, the identity of the first user is associated with a role assigned to the first user, and the role is associated with at least the first packet rule. The first packet rule is selected based on the role.

This embodiment and/or aspects thereof may be implemented as a computer program product that includes a computer-readable medium and computer-readable signals stored on the computer-readable medium, which signals define appropriate instructions. These instructions, as a result of being executed by a computer, instruct the computer to perform the acts described above for this illustrative embodiment.

In another embodiment of the invention, a network device of a communications network is provided for controlling usage of network resources of the communications network by a plurality of users. The network device serves as an entry point to the communications network for the plurality of users and includes a port module, where the port module is connected by a transmission medium to a first user device used by a first of the plurality of users and located externally to the communications network. The port module also is connected by the transmission medium to a second user device used by a second of the plurality of users and located externally to the communications network. The system comprises port configuration logic to configure the port module with one or more packet rules, where at least a first of the one or more packet rules is associated with the identity of the first user and at least one of the one or more packet rules is associated with the identity of the second user.

In an aspect of this embodiment, the port module further comprises a physical port to receive a first packet from a user device and user identification logic to determine an identity of a user of the user device. The port module further comprises rule application logic to apply at least the first rule to the first packet, before using any of the network resources beyond the network device in response to processing packet, if the determined identity is the identity of the first user.

In another aspect of this embodiment, concurrently to the first user being logged on to the communication network, the rule application logic is further operative to apply the at least one packet rule to the second packet, before using any of the network resources beyond the network device in response to processing the second packet, if the determined identity is the identity of the second user.

In another aspect of this embodiment, the rule application logic is operative to apply the one or more packet rules to all packets received from the device of the first user at the port module until the first user logs off of the communications network.

In yet another aspect of this embodiment, the at least one packet rule is the first packet rule. In another aspect of this embodiment, the port configuration logic is further operative to configure the port module with a plurality of packet rules, the at least one packet rule is not associated with the first user and the first packet rule is not associated with the second user.

In another aspect of this embodiment, the port module further comprises authentication logic to authenticate the identity of at least the first user, where the configuration logic is operative to configure the port module in response to the authentication.

In yet another aspect of this embodiment, the port configuration logic is operative to select the first packet rule based on the identity of the first user and to select the at least one packet rule based on the identity of the second user.

In another aspect of this embodiment, the identity of the first user is associated with a role assigned to the first user. The role is associated with at least the first packet rule, and the port configuration logic is operative to select at least the first packet rule based on the role.

In another embodiment of the invention, a network device of a communications network is provided for controlling usage of network resources of the communications network by a plurality of users, where the network device serves as an entry point to the communications network for the plurality of users and includes a port module. The port module is connected by a transmission medium to a first user device used by a first of the plurality of users and located externally to the communications network, and the port module is connected by the transmission medium to a second user device used by a second of the plurality of users and located externally to the communications network. The network device comprises means for configuring the port module with one or more packet rules associated with an identity of the first user and an identity of the second user, where at least a first of the one or more packet rules is associated with the identity of the first user.

In another embodiment of the invention, usage of network resources of a communications network by a user beyond a network device of the communications network that serves as the user's entry point to the communications network is controlled. The port module of the network device is configured with one or more packet rules corresponding to an identity of the user. A packet is received from a device used by the user at the port module, and, before using any of the network resources beyond the network device, the one or more packet rules are applied to the received packet.

In an aspect of this embodiment, the identity of the user is authenticated and the configuring of the port module is based on the authentication.

In another aspect of this embodiment, the one or more packet rules are applied to all packets received at the port module until the user logs off of the communications network.

In another aspect of this embodiment, the port module is dedicated to the device of the user until the user logs off of the communications network.

In another aspect of this embodiment, the one or more packet rules are selected based on the identity of the user.

This embodiment and/or aspects thereof may be implemented as a computer program product that includes a computer-readable medium and computer-readable signals stored on the computer-readable medium, which signals define appropriate instructions. These instructions, as a result of being executed by a computer, instruct the computer to perform the acts described above for this illustrative embodiment.

In another embodiment, provided is a network device serving as an entry point to a communications network for a user and operative to control usage of network resources by the user beyond the network device. The network device includes a port module including port configuration logic to configure the port module with one or more packet rules corresponding to an identity of the user, a physical port to receive a packet from a device of the user and rule application logic to apply the one or more packet rules to the received packet before using any of the network resources beyond the network device.

In an aspect of this embodiment, the system includes authentication logic to authenticate the identity of the user, where the configuration logic is operative to configure the port module in response to the authentication.

In another aspect of this embodiment, the rule application logic is operative to apply the one or more packet rules to all packets received from the device of the user at the port module until the user logs off of the communications network.

In another aspect of this embodiment, the port module is dedicated to the device of the user until the user logs off of the communications network.

In yet another aspect of this embodiment, the port module is coupled to the device of the user by a dedicated transmission medium.

In another aspect of this embodiment, the port configuration logic is operative to select the one or more packet rules based on the identity of the user.

In another embodiment, a network device of a communications network is provided for controlling usage of network resources of the communications network by a plurality of users, where the network device serves as an entry point to the communications network for the plurality of users and includes a port module. The port module is connected by a transmission medium to a first user device used by a first of the plurality of users and located externally to the communications network, and the port module is connected by the transmission medium to a second user device used by a second of the plurality of users and located externally to the communications network. The network device comprises means for configuring the port module with one or more packet rules associated with an identity of the first user and an identity of the second user, where at least a first of the one or more packet rules is associated with the identity of the first user.

In an aspect of this embodiment, the system comprises: means for receiving a first packet at the port module from a user device, means for determining an identity of a user of the user device, and means for applying at least the first rule to the first packet if the determined identity is the identity of the first user before using any of the network resources beyond the network device in response to processing the first packet. In another aspect of this embodiment, the system further comprises means for determining the identity and applying the packet rules for all packets received at the port module from the first user device until the first user logs off of the communications network.

In another aspect of this embodiment, the system comprises means for applying the at least one packet rule to the second packet if the determined identity is the identity of the second user, before using any of the network resources beyond the network device in response to processing the second packet, concurrently to the first user being logged on to the communications network.

In yet another aspect of this embodiment, the at least one packet rule is the first packet rule. In another aspect of this embodiment, the first packet rule is not associated with the second user and the at least one packet rule is not associated with the first user.

In another aspect of this embodiment, the system further comprises means for authenticating the identity of at least the first user before configuring the port module with the one or more packet rules, where the port module is configured with at least the first packet rule in response to the authentication.

In another aspect of this embodiment, the system further comprises means for selecting the first packet rule based on the identity of the first user and selecting the at least one packet rule based on and the identity of the second user.

In yet another aspect of this embodiment, the identity of the first user is associated with a role assigned to the first user, and the role is associated with at least the first packet rule, and the system further comprises means for selecting the first packet rule based on the role.

In another embodiment of the invention, provided is a network device serving as an entry point to a communications network for a user. The network device operative to control usage of network resources beyond the network device by the user and includes a port module including a physical port to receive a packet from a device used by the user and rule application logic to apply one or more packet rules to the received packet before using any of the network resources beyond the network device, and means for configuring the port module with the one or more packet rules based on an identity of the user.

In an aspect of this embodiment, the system includes authentication logic to authenticate the identity of the user, where the configuration logic is operative to configure the port module in response to the authentication.

In another aspect of this embodiment, the rule application logic is operative to apply the one or more packet rules to all packets received from the device of the user at the port module until the user logs off of the communications network.

In another aspect of this embodiment, the port module is dedicated to the device of the user until the user logs off of the communications network.

In yet another aspect of this embodiment, the port module is coupled to the device of the user by a dedicated transmission medium.

In yet another aspect of this embodiment, the means for configuring is operative to select the one or more packet rules based on the identity of the user.

In another embodiment of the invention, usage of network resources of a communications network by a user is controlled. The user has an assigned role with respect to the communications network, and the assigned role is associated with one or more packet rules, each packet rule including a condition and action to be taken if a packet received at a device satisfies the condition. A packet including identification information of the user is received from a device of the user at a port module of a network device. The assigned role of the user is determined based on the identification information, and the port module is configured with the one or more packet rules associated with the assigned role of the user.

In an aspect of this embodiment, the network device serves as an entry point to the communications network for the user.

In another aspect of this embodiment, the user information about the user is stored on a computer-readable medium residing on the communications network, and the user information includes identification information and the assigned role of the user. The stored user information is accessed to determine if the identification information included therein matches the identification information included in the received packet. If it is determined that the stored identification information matches the received identification information, the assigned role is determined from the stored user information.

This embodiment and/or aspects thereof may be implemented as a computer program product that includes a computer-readable medium and computer-readable signals stored on the computer-readable medium, which signals define appropriate instructions. These instructions, as a result of being executed by a computer, instruct the computer to perform the acts described above for this illustrative embodiment.

In yet another embodiment of the invention, provided is a system for controlling usage of network resources of a communications network by a user. The user has an assigned role with respect to the communications network, and the assigned role is associated with one or more packet rules, each packet rule including a condition and action to be taken if a packet received at a device satisfies the condition. The system includes a port module including a physical port to receive a packet including identification information of the user from a device of the user and port configuration logic to configure the port module with the one or more packet rules associated with the assigned role of the user, and an authentication module to determine the assigned role of the user based on the identification information.

In an aspect of this embodiment, the port module serves as an entry point to the communications network for the user.

In another aspect of this embodiment, user information about the user is stored on a computer-readable medium residing on the communications network, where the user information includes identification information and the assigned role of the user. The authentication module is operative to control accessing the stored user information to determine if the identification information included therein matches the identification information included in the received packet, and to determine the assigned role from the stored user information if it is determined that the stored identification information matches the received identification information.

In another embodiment of the invention, provided is a system for controlling usage of network resources of a communications network by a user. The user has an assigned role with respect to the communications network, and the assigned role is associated with one or more packet rules, where each packet rule including a condition and action to be taken if a packet received at a device satisfies the condition. The system includes a port module including a physical port to receive a packet including identification information of the user from a device of the user and port configuration logic to configure the port module with the one or more packet rules associated with the assigned role of the user, and means for determining the assigned role of the user based on the identification information.

In an aspect of this embodiment, the port module serves as an entry point to the communications network for the user.

In another aspect of this embodiment, user information about the user is stored on a computer-readable medium residing on the communications network, and the user information includes identification information and the assigned role of the user. The means for determining is operative to control accessing the stored user information to determine if the identification information included therein matches the identification information included in the received packet, and to determine the assigned role from the stored user information if it is determined that the stored identification information matches the received identification information.

Other advantages, novel features, and objects of the invention, and aspects and embodiments thereof, will become apparent from the following detailed description of the invention, including aspects and embodiments thereof, when considered in conjunction with the accompanying drawings, which are schematic and which are not intended to be drawn to scale. In the figures, each identical or nearly identical component that is illustrated in various figures is represented by a single numeral. For purposes of clarity, not every component is labeled in every figure, nor is every component of each embodiment or aspect of the invention shown where illustration is not necessary to allow those of ordinary skill in the art to understand the invention.

BRIEF DESCRIPTION OF THE DRAWINGS

FIG. 5 is a block diagram illustrating an example of a packet rule data structure for storing one or more packet rules;

FIG. 6 is a block diagram illustrating an example of a service data structure for storing one or more service abstractions;

FIG. 7 is a block diagram illustrating an example of a role data structure for storing one or more roles;

FIG. 8 is a screen shot illustrating an example of a graphical user interface for editing a packet rule;

FIGS. 13A–13C comprise a flow chart illustrating an example of a method of controlling usage of network resources by one or more users at such users' entry point to a communications network;

FIGS. 14A and 14B comprise a flow chart illustrating an example of a method of applying packet rules to a packet received at an entry port module of a network device of a communications network to control usage of network resources by a user.

DETAILED DESCRIPTION

Figure 1A:
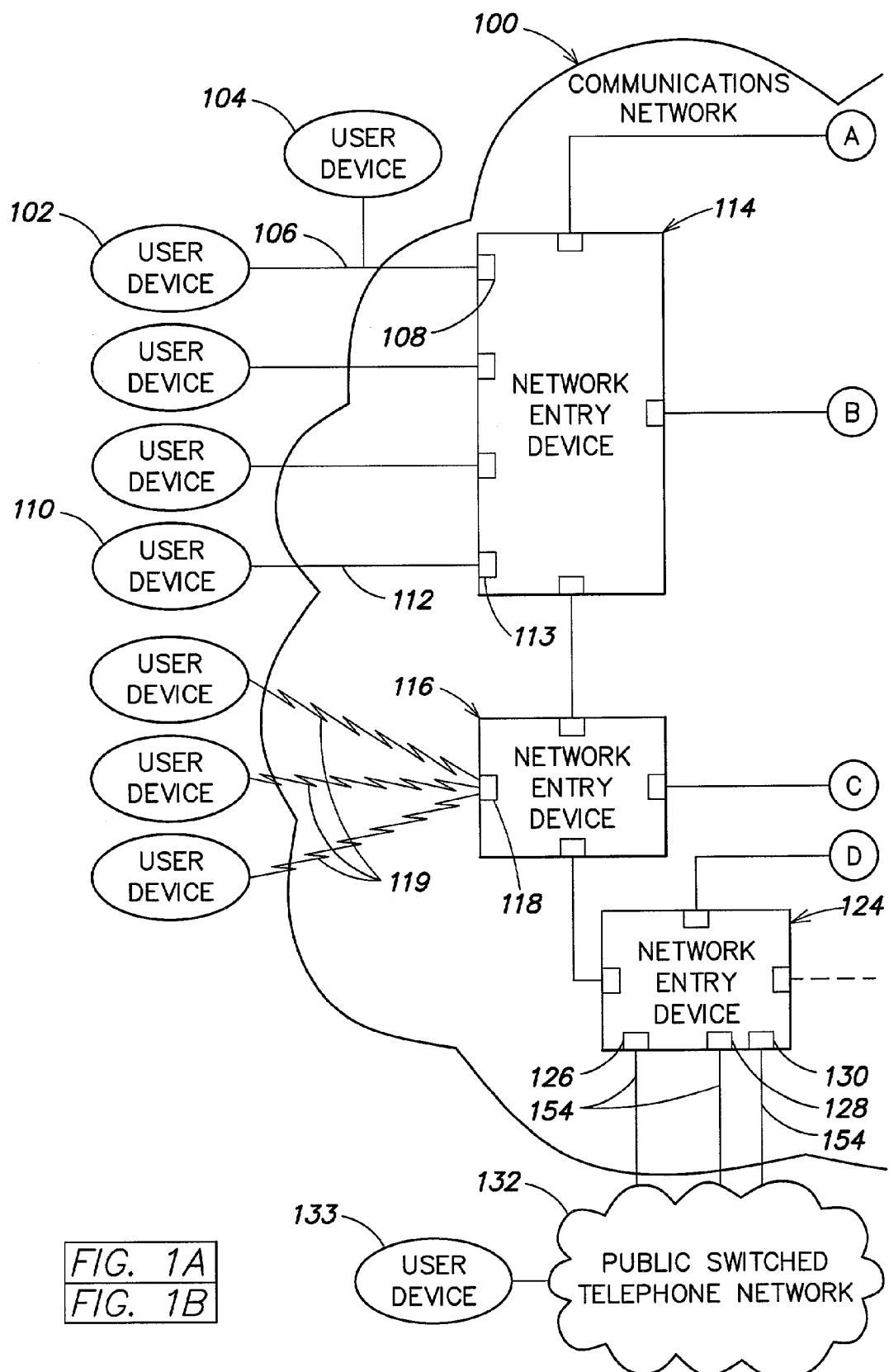
FIG. 1 is a block diagram illustrating an example of a communications network.

Described below is a system and method that control a user's usage of network resources, after the user has been authenticated, without using any network resources beyond the user's entry point to the network.

In an embodiment, a plurality of users are connected to an entry point of a network of a network device by a shared transmission medium. In such embodiment, each users' usage of network resources is controlled after such user has been authenticated without using any network resources beyond such user's entry point to the network.

For each of the one or more users, packet rules may be provisioned to the user's entry point to the network, where such entry point may be shared with other users. The packet rules may be applied to each packet received from the user before any network resources beyond the entry point are used. These packet rules may be associated with an identity of the user and then provisioned to the user's entry point in response to the user being authenticated.

In an embodiment, when a plurality of users are connected to an entry point by a shared transmission medium, packet rules associated with the users may be provisioned to the entry point and applied to packets received from the users before any network resources beyond the entry point are used. It should be noted that one or more packet rules may be associated with more than one user and thus may be applied to each packet received from the one or more users at a shared entry point to the network. As used herein, a "shared entry point" is an entry point connected to a plurality of users by a shared transmission medium.

Such packet rules may be provisioned to a number of network entry devices and may serve as a distributed firewall for users of a network, as opposed to a centralized firewall. Such distributed firewall reduces use of network resources from users exchanging packets with resources external to the network by applying packet rules at each user's entry point to the network, as opposed to applying the rules after the user has already consumed bandwidth and processing resources as is typical on a network with a more centralized firewall.

Such system and method combine the ability of authentication systems to associate network access to an identity of a user and the ability of network entry devices to examine a packet received from a user before the packet is allowed to proceed on to the network and cause the consumption of network resources.

An entry port module of a network entry device may be configured based on an identity of one or more users as a result of the authentication of the one or more users, respectively, and each packet received from each user may be examined to control usage of network resources by the user.

Configuring multiple entry port modules according to an authenticated identity of one or more users allows each of the one or more users to access a network via any such configured entry port module (appropriately configured as described herein) on any network device of the network. Accordingly, each user does not have to be accessing the network at a specific port configured with specific access rules. Nor does each user have to access the network from a specific network address.

According to another system and method described below, to ease the configuration, implementation, and administration of network policy and packet rules, provided herein are roles and service abstractions that provide a mechanism for aggregating one or more packet rules into a single re-usable entity. Roles and service abstractions ease the configuration, implementation, and administration of packet rules and network policy by enabling the reuse, storage, and modification of an aggregation of one or more packet rules. Instead of defining and/or aggregating a new set of packet rules each time a port of a device is configured, a pre-defined set of packet rules can be used to configure multiple ports and at different times, and can be used to configure the same port multiple times. Further, instead of configuring each existing or new device in a network individually, roles and service abstractions can be used to concurrently configure a number of devices, regardless of location in the network.

In addition to easing the configuration, implementation, and administration of network policy and packet rules, roles and service abstractions provide the ability for technological concepts embodied in packet rules to be represented in a less technical, or non-technical way.

In an embodiment of the invention, service abstractions are created. As used herein, a "service abstraction" is an abstraction representing a named set of one or more packet rules. A service abstraction may define a service to be provided to users of a network.

As used herein, a "packet rule" is a rule specifying a condition that may be satisfied by a packet, and an action to be taken if a packet satisfies the condition, and a "set" means a group of one or more.

Service abstractions may be stored and later modified, and may be distributed to one or more network devices. Service abstractions may be assigned to one or more users of the network, and may be used to configure a port module of a network device.

In another embodiment of the invention, one or more roles may be created. As used herein, a "role" or "role abstraction" is an abstraction representing a named set of one or more packet rules associated with a role of a person, for example, in relation to an organization or communications network. In an aspect of this embodiment, a role is an abstraction representing a named set of one or more service abstractions. Such roles may be stored and later modified, and may be distributed to one or more network devices. Roles may be assigned to one or more users of the network, and may be used to configure a port module of a network device.

In yet another embodiment of the invention, a port module of a network device, for example, an entry port module of a network entry device, is configured in accordance with an identity of one or more users. For example, the port module may be configured with one or more packet rules corresponding to the identity of one or more users.

In an embodiment of the invention, usage of network resources by one or more users is controlled based on the identity of each user, respectively. For example, packet rules corresponding to the identity of each user may be applied to packets received from the user's device at an entry port module.

The function and advantage of these and other embodiments of the present invention will be more fully understood from the examples described below. The following examples are intended to illustrate the benefits of the present invention, but do not exemplify the full scope of the invention.

EXAMPLES

Figure 2:
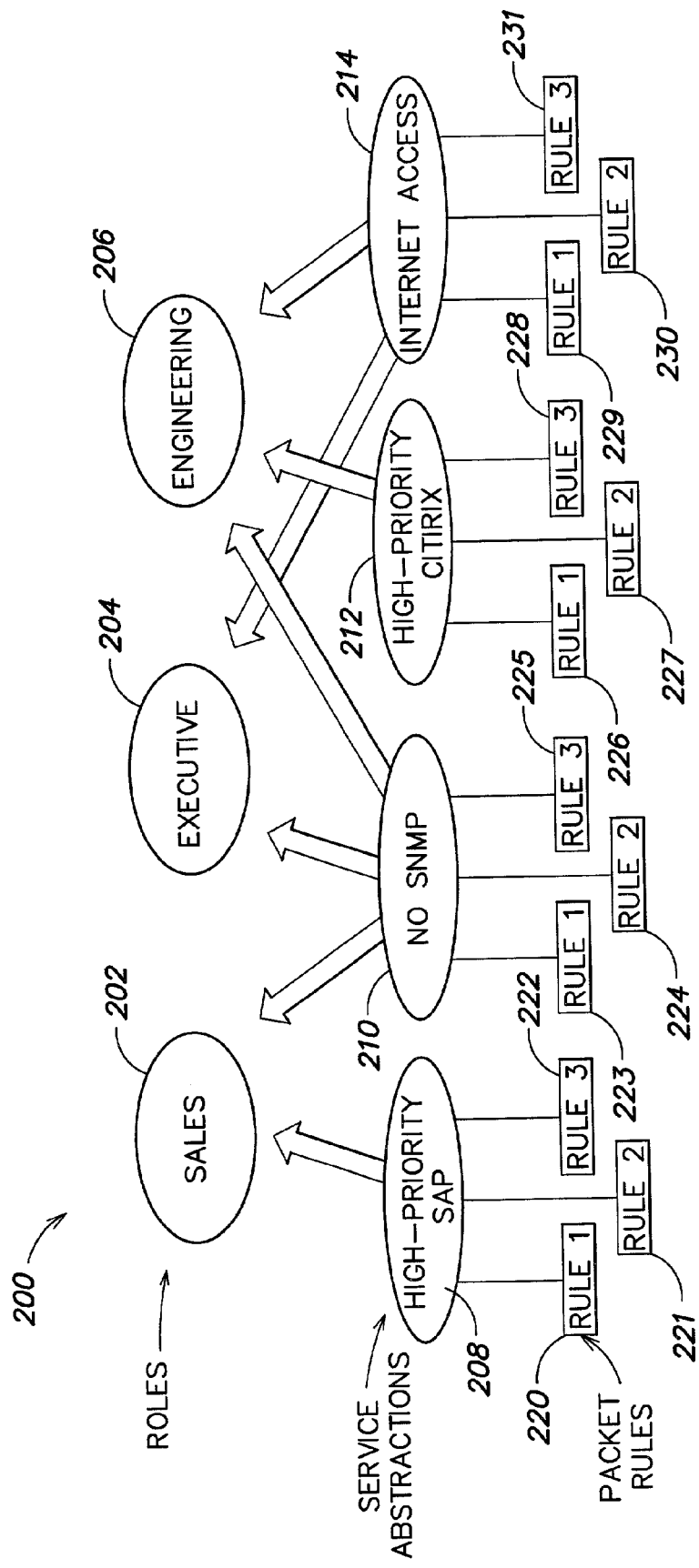
FIG. 2 is a block diagram illustrating an example of a relationship hierarchy.

FIG. 2 is a block diagram illustrating an example of a relationship hierarchy 200. The relationship hierarchy 200 may include one or more roles 202–206, one or more service abstractions 208–214 and one or more packet rules 220–231.

Each of the packet rules define a rule to be applied to a packet received at a device, for example, a device of the communications network 100. Each packet rule may be defined to examine information included in a packet and to perform actions based on such information. The information to be examined may be any information that may be included in a packet.

Each rule may include a condition and an action to be taken if the condition is satisfied. Actions defined by packet rules may include, but are not limited to, assigning a VLAN to the packet, assigning priority to the packet, applying rate limiting to the packet, routing the packet, and dropping the packet.

Packet rules may be configured to examine any information included in a packet. As is known in the field of network communications, different portions of a packet may include information pertaining to different protocol layers. These layers may include an application layer, presentation layer, session layer, transport layer, network layer and data link layer, which correspond to layers seven through two, respectively, of the Open System Interconnection (OSI) networking framework model. A packet rule may be defined to examine any portion of a packet, and thereby examine information pertaining to any protocol layer. For example, a packet rule may be configured to examine information in a packet as described in *Layer 2/3/4 Frame Classification Primer*, a white paper made available from Enterasys Networks, Inc., accessible as of the date of the filing of this application at http://www.enterasys.com/products/whitepapers/switching/layer-primer/index.html, the entire contents of which are hereby incorporated by reference.

Packet rules may be relatively technical such that a network programmer understands the packet rule, but a network manager or administrator does not. For example, a packet rule may define an action to be taken if a particular logical port number specifying a particular application is included in a field of the packet received for application information.

For this reason, it is desirable to allow a network manager the ability to define services to be provided for users using service abstractions 208–214, where each service abstraction has a meaning to an administrator within the context of a communications network (i.e., specifies a service to be provided to users), but does not include the technical details of packet rules. For example, one should not have to be too technical to understand that Internet Access service abstraction 214 represents a service that provides access to the Internet for users. However, one may have to be far more technical to understand the packet rules 229–231 included in Internet Access service abstraction 214.

Although not illustrated in FIG. 2, in an embodiment, a packet rule may be included in a plurality of service abstractions. Further, different rules may define a same condition and/or a same action, even though these different rules are not the same abstraction. For such different packet rules, an application may be defined to enable a user to copy the condition and/or action of one packet rule and paste it/them into another packet rule.

One or more of these service abstractions may be grouped together to define a role. As illustrated in FIG. 2, a service abstraction may be included in a plurality of roles. It may be desirable to define a role to correspond with an actual role within an organization whose members are or will be users of the communications network on which the role will be deployed. For example, if the organization is a business organizations, then roles 202, 204 and 206 may be defined to correspond to a sales department, an executive department and engineering department, respectively, of the business organization.

Further, it may be desirable to define a role to correspond with the infrastructure of the network. For example, if subnetworks (e.g., Internet Protocol (IP) subnetworks, Windows NT domains, or a VLAN) have been configured within the network, it may be desirable to have the roles correspond to the subnetworks. Thus, if the network has been configured to include subnetworks for a sales department, an executive department and an engineering department, respectively, it may be desirable to define roles 202, 204 and 206, respectively, to correspond to such subnetworks.

Although FIG. 2 illustrates only one level in the hierarchy corresponding to roles, a relationship hierarchy may include many levels of roles. In such hierarchy, each role situated at any level above the lowest level may include one or more roles from the next-lowest level. For example, a sales department of an organization may be organized by geographical regions, such that the sales department has an east coast division and a west coast division. Accordingly, a west coast sales role and an east coast sales role may be created at a lowest level of roles in the hierarchy, and a sales role in the next highest level may be created that includes both the east coast sales role and the west coast sales role.

The additional flexibility gained by including multiple levels of roles in a relationship hierarchy should be weighed against the complexity added by creating, maintaining, administering and distributing such relationship hierarchy.

Relationship hierarchy 200 is merely an illustrative embodiment of a relationship hierarchy. Such illustrative embodiment is not intended to limit the scope of the invention, as any of numerous other implementations of a relationship hierarchy, for example, variations of relationship 200, are possible and are intended to fall within the scope of the invention. For example, although roles are primarily described herein as including one or more service abstractions, and thereby including one or more packet rules, alternatively, roles may be defined to include one or more packet rules without service abstractions serving as the glue between the two. Thus, the methods and systems described below for editing and distributing roles, and configuring port modules according to roles may be implemented using roles defined to include one or more packet rules without using service abstractions.

Figure 3:
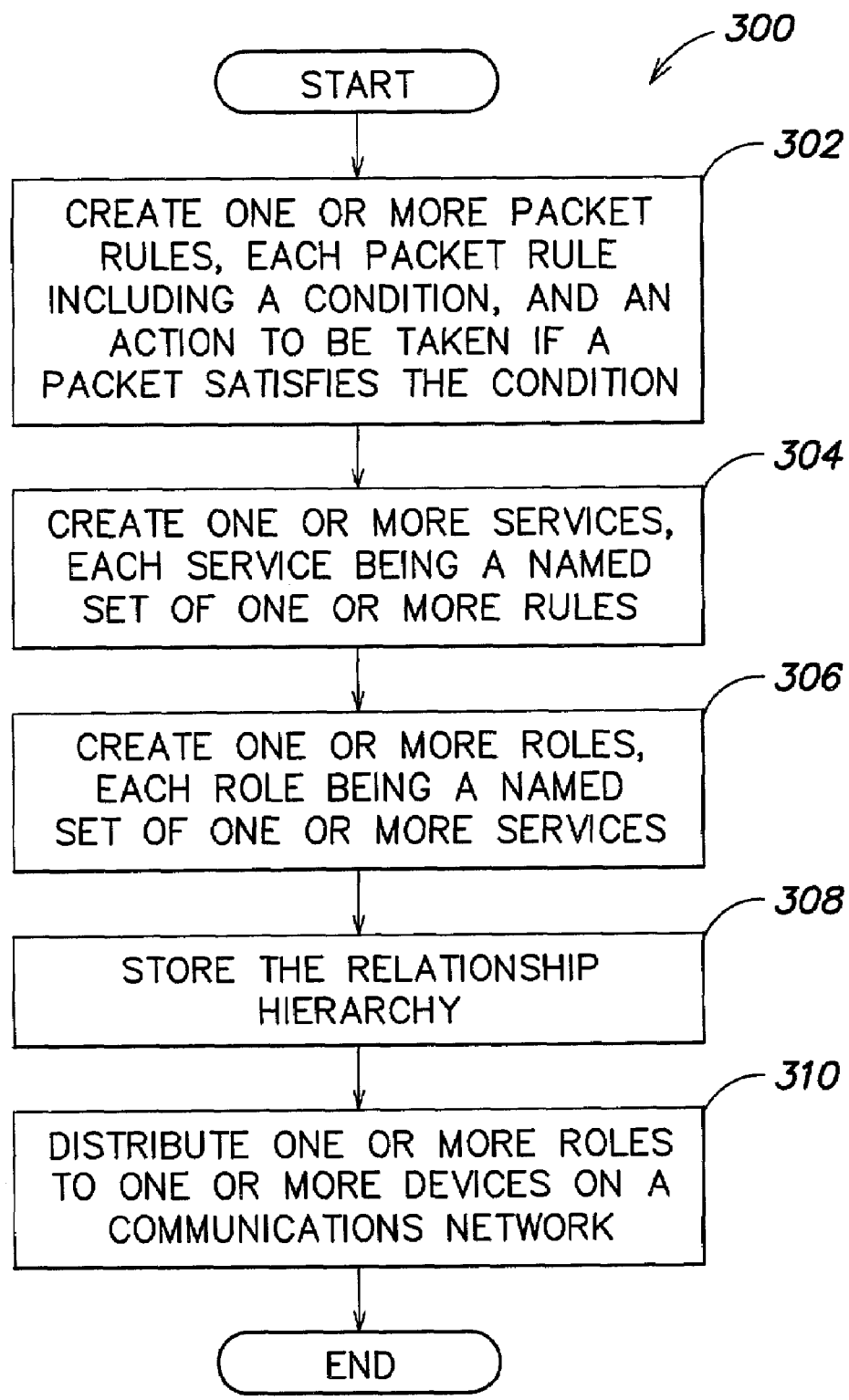
FIG. 3 is a flow chart illustrating an example of a method of creating a relationship hierarchy.

FIG. 3 is a flow chart illustrating an example of a method 300 of creating a relationship hierarchy. In Act 302, one or more packet rules may be created, where each packet rule includes a condition and an action to be taken if a packet satisfies the condition. Information that may be included in a packet rule is described below in more detail in relation to FIG. 5.

In Act 304, one or more service abstractions may be created, each service abstraction being a named set of one or more packet rules. Information that may be included as part of a service abstraction is described below in more detail in relation to FIG. 6.

In a following Act 306, one or more roles may be created, each role being a named set of one or more service abstractions. Information that may be included as part of a role is described below in more detail in relation to FIG. 7.

Regardless of the method by which a relationship hierarchy is created, it may be desirable to design the structure of the hierarchy using a top-down approach. Using such approach, the roles that are to be created are first determined. Such roles may be designed to reflect the infrastructure of a network and/or roles within an organization whose members are users of the network. Next, for each role, the service abstractions to be associated with the role may be determined.

For example, it may be determined that users that are assigned an executive role 204 should have Internet access, but should not be able to transmit packets on the network for managing devices on the network. This may lead to the creation of the Internet Access service abstraction 214 and the inclusion of this service abstraction in an executive role 204, and the creation of the NO SNMP service abstraction 210 and the inclusion of this service abstraction in the executive role 204. The Simple Network Management Protocol (SNMP) is a set of protocols for managing a network.

For each service abstraction, the packet rules to be associated with the service abstraction may be determined. As discussed above, packet rules are relatively technical in comparison to service abstractions. Further, service abstractions may be more technical than roles. For this reason, service abstractions may be considered the "glue" between roles and packet rules.

Returning to FIG. 3, in Act 308, the relationship hierarchy may be stored for later use, for example, on a computer-readable medium such as relationship database 410 described below in relation to FIG. 4.

In a following Act 310, one or more roles may be distributed to one or more devices on the communications network. An example of distributing roles is described below in more detail in relation to Act 1304 of FIG. 13A.

Method 300 may include additional acts. Further, the order of the acts performed as part of method 300 is not limited to the order illustrated in FIG. 3, as the acts may be performed in other orders, and one or more of the acts of method 300 may be performed in series or in parallel to one or more other acts, or parts thereof. For example, Acts 302, 304 or 306, or parts thereof, may be performed in parallel, and by different users at different locations.

Method 300 is an illustrative embodiment of a method of creating a relationship hierarchy. Such illustrative embodiment is not intended to limit the scope of the invention, as any of numerous other implementations of creating a relationship hierarchy, for example, variations of method 300, are possible and are intended to fall within the scope of the invention.

Method 300, acts thereof and various embodiments and variations of these methods and acts, individually or in combination, may be implemented as a computer program product tangibly embodied as computer-readable signals on a computer-readable medium, for example, a non-volatile recording medium, an integrated circuit memory element, or a combination thereof. Such computer program product may comprise computer-readable signals tangibly embodied on the computer-readable medium, where such signals define instructions, for example, as part of one or more programs, that, as a result of being executed by a computer, instruct the computer to perform one or more of the methods or acts described herein, and/or various embodiments, variations and combinations thereof. Such instructions may be written in any of a plurality of programming languages, for example, Java, Visual Basic, C, or C++, Fortran, Pascal, Eiffel, Basic, COBAL, etc., or any of a variety of combinations thereof. The computer-readable medium on which such instructions are stored may reside on one or more of the components of network 100 described above and/or system 400 described below, and may be distributed across one or more of such components.

Figure 4:
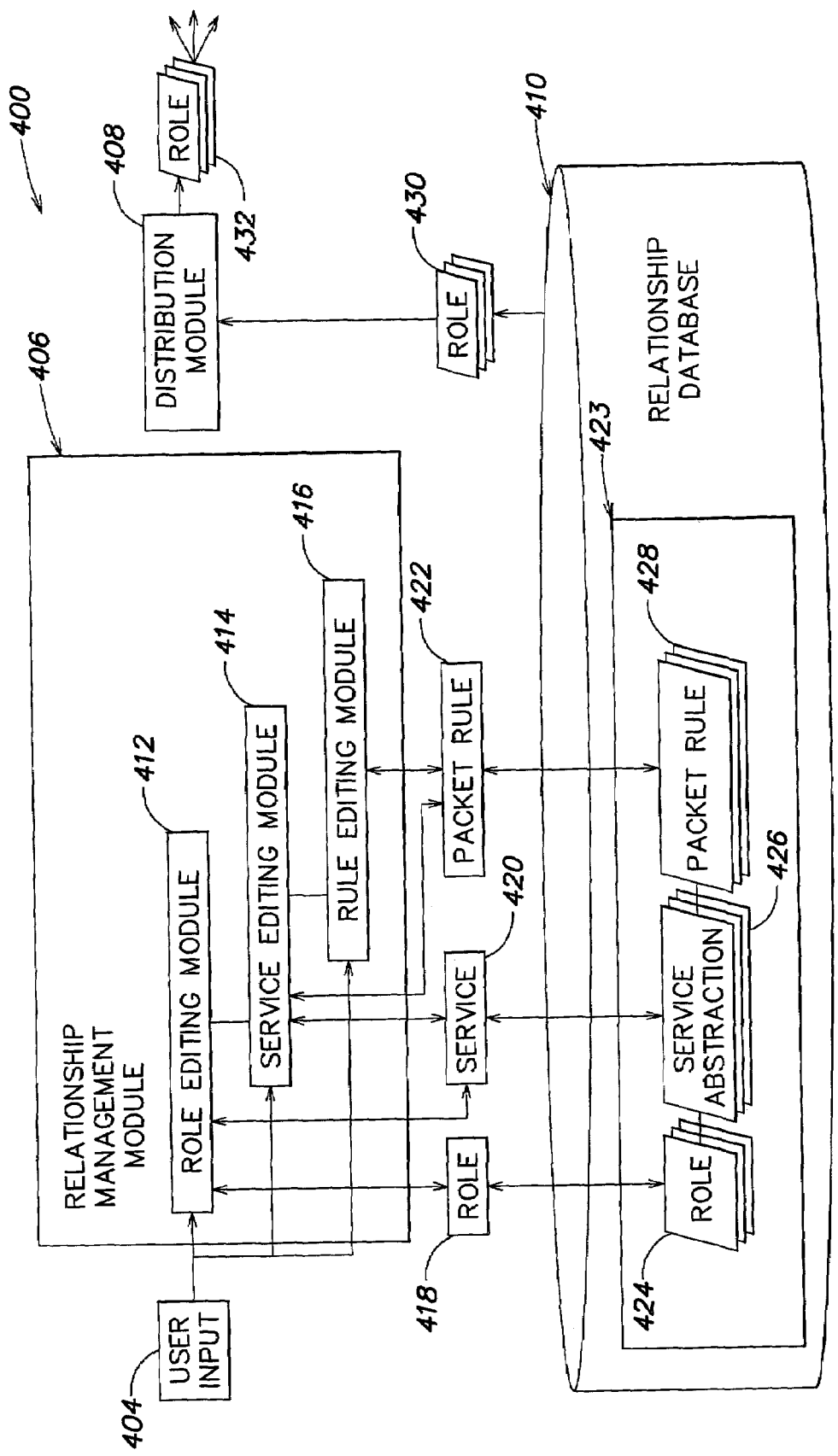
FIG. 4 is a block diagram illustrating an example of a system for editing and distributing a relationship hierarchy.

FIG. 4 is a block diagram illustrating an example of a system 400 for editing and distributing a relationship hierarchy. The system 400 may include a relationship management module 406, a distribution module 408 and a relationship database 410.

The relationship database 410 may include one or more relationship hierarchies 423, each relationship hierarchy 423 including one or more roles 424, one or more service abstractions 426 and one or more packet rules 428, such as those described below in relation to FIGS. 5–7.

FIG. 5 is a block diagram illustrating an example of a packet rule data structure 500 for storing one or more packet rules. Such data structure 500 may be a table of a relational database, an object of an object-oriented database, a record of a flat file, a combination thereof, or other type of data structure. Data structure 500 may be included as part of relationship database 410 and may store one or more of the packet rules 428.

The data structure 500 may include a plurality of entries, including entry 502. Each entry may include a plurality of fields, including, but not limited to, name field 504, status field 506, type field 508, value field 510, mask field 512, VLAN field 515, priority field 516, deny field 518, rate limit field 520 and layer field 522.

The name field 504 may store a value (e.g., a name) for uniquely identifying a packet rule, and status field 506 may store a value representing the status of such packet rule. For example, a packet rule may be "enabled" such that a device may be configured with the packet rule, or the status of a packet rule may be "disabled" such that a device cannot be configured with the packet rule. Further, the service editing module 414 described below may be configured such that if a rule has a status of disabled, a service abstraction cannot be defined to include the packet rule.

Type field 508 may store a value representing the type of a packet rule. A device that applies a packet rule may be configured to examine particular information stored within a packet (e.g., within one or more fields) based on the value stored in the type field 508 for the packet rule.

Value field 510 may store a value to be compared against information included in a packet to determine if the information matches the value. Mask field 512 may store a value representing a mask to be applied to the information in the packet to be compared to the value field 510. For example, a bit-wise logical AND operation may be performed between the value stored in mask field 512 and the value of the information included in the packet specified by type field 508. The result of this comparison then may be compared to the value specified in value field 510. The mask field 512 may be used only for certain packet rules, for example, rules that specify an IP subnetwork address.

VLAN field 514 may store a value representing a VLAN to be assigned to a packet that satisfies the conditions specified by fields 508–512 of an entry. For example, VLAN field 514 may store a value representing a VLAN as described in IEEE 802.1Q.

Priority field 516 may store a value representing a priority to be assigned to a packet that satisfies the conditions specified by fields 508–512 of an entry. For example, priority field 516 may store a value representing a Quality of Service (QoS)/Class of Service (CoS) as described in IEEE 802.1D, 1998 edition, accessible as of the filing date of this application at http://standards.ieee.org/getieee802/802.1.html, the entire contents of which is hereby incorporated by reference.

Deny field 518 may store a value (e.g., a flag) indicating whether or not to deny access to the resources of a communications network by a packet that satisfies conditions specified by fields 508–512 of an entry. Some packet rules may specify that a packet is to be dropped if the condition of the rule is satisfied. For example, a packet rule may specify that if a logical port number identified in the packet corresponds to a particular application, the packet is to be dropped. Using field 518, a network administrator may configure a packet rule to prevent certain users from using particular applications such as sensitive business applications running on the network or games residing on the network.

Rate limit field 520 may store a value representing a rate limit to be applied to a packet if it satisfies the rule. Some rules may be defined such that if the condition of the rule is satisfied by a packet, then rate limiting will be applied to a packet. In such case, rate limit field 520 may specify a threshold value (e.g., 1 megabyte (MB)). This threshold value may specify a threshold volume of bytes that may be received during a specified temporal interval (e.g., one second) in packets that satisfy a particular rule. The temporal interval may be specified in field 520 itself or in another field.

For example, an entry of data structure 500 may specify a value such as 1 MB/sec, for which a network device may be configured to interpret as meaning that the number of bytes that may be transmitted in packets that satisfy the conditions of 508–512 during one second cannot exceed 1 MB. Further, a network device may be configured to drop some or all of the bytes of a packet that contains an amount of packets that exceeds the threshold amount during the unit interval. Such rate limiting technique may be used to limit the amount of bandwidth that a user may consume in sending packets to a particular network device specified by conditions 508–512, or limit the amount of bandwidth that a user consumes on the network in sending packets corresponding to a particular application specified by conditions 508–512. The consumption of bandwidth by a user also may be limited by the priority specified in field 516.

Layer field 522 may store a value representing a layer of the OSI network model to which a rule of an entry pertains.

Field 504 of packet rule entry 502 specifies that the entry represents a packet named "contain subnet 54." Field 506 of entry 502 specifies that the status of this rule is "enabled" such that it may be used to configure a network device.

Field 508 of entry 502 specifies that the type of the packet rule is "IP Address Bilateral." This type of packet rule may specify that the source and destination (i.e., bilateral) IP addresses of a packet are to be examined.

Field 510 of entry 502 specifies that the value to be compared to the IP addresses of the received packet is "10.20.54.0," where each decimal value represents an 8-bit binary value. Further, mask field 412 specifies that a mask of "255.255.255.0" (which represents 3 octets of binary "1"s followed by an octet of all "0"s) is to be ANDed to both the IP source address and the IP destination address before comparing these addresses to the binary equivalent of "10.20.54.0" (i.e., "00110110.00010000.00001010.00000000").

VLAN field 514 of entry 502 has a value of "5", specifying that should the IP source address or IP destination address match the value stored in value field 510 after applying the mask 512, then the received packet shall be assigned a VLAN value of 5, where the value of 5 may correspond to a particular VLAN such as an engineering VLAN. Thus, a device configured with the packet rule represented by entry 502 may be configured to append a VLAN header to a received packet, where the VLAN header includes a field specifying VLAN 5. Further, such device may be configured to change the VLAN header to specify VLAN 5 if the received packet already includes a VLAN header.

Priority field 516 of entry 502 has a value of "7", specifying that if a received packet satisfies the conditions specified by fields 508 through 512, then a priority of 7 may be assigned to the packet. Accordingly, a network device configured with this packet rule may be configured to append a priority tag in the received packet or change a priority that is already specified by a header (e.g., a VLAN header) of the packet to a value of "7."

Deny field 518 of entry 502 has a value of "NO", specifying that if a packet satisfies the conditions specified in fields 508–512, the packet will not be denied (e.g., dropped).

Rate limit field 520 of entry 502 has a value of "none." Such value may specify that no rate limiting is to be applied to a received packet if the received packet satisfies the conditions specified in fields 508–512 of entry 502.

Layer field 522 of entry 502 specifies that the layer corresponding to this rule is layer 3 (i.e., the network layer) of the OSI network model.

Data structure 500 is an illustrative embodiment of a data structure for storing one or more packet rules. Such illustrative embodiment is not intended to limit the scope of the invention, as any of numerous implementations of a data structure for storing packet rules, for example, variations of data structure 500, are possible and are intended to fall within the scope of the invention.

FIG. 6 is a block diagram illustrating an example of a service data structure 600 for storing one or more service abstractions. Such data structure 600 may be a table of a relational database, an object of an object-oriented database, a record of a file, a combination thereof, or other type of data structure. Data structure 600 may be included as part of relationship database 410 and may include one or more of the service abstractions 426. The data structure may include a plurality of entries, including entry 602. Each entry may include a plurality of fields including, but not limited to, name field 604 and rule fields 606–612.

The name field 604 may be for storing a value (e.g., a name) that uniquely identifies a service abstraction, whereas each rule field 606–612 may store a value for specifying a rule. Each rule field 606 may hold a value that serves as an index or key to an entry 502 of the packet rule data structure 500.

Name field 604 of entry 602 specifies a service abstraction named "Contain IP Eng Subnet Traffic." This service abstraction may be used to contain and prioritize traffic originating from or destined for one or more IP subnetworks corresponding to an engineering department of a company.

Field 606 of entry 602 specifies that the packet rule entitled "Contain Subnet 54" is included as part of this service abstraction. This value may be used to index entry 502 of the packet rule data structure 500. Each of fields 608–612 of entry 602 specifies another packet rule included as part of this service. The names stored in these fields in FIG. 6 imply that these rules may specify similar conditions and actions for packets that include a destination or source IP address corresponding to subnetworks 55, 56 or 57, respectively.

Data structure 600 is an illustrative embodiment of a data structure for storing one or more service abstractions. Such illustrative embodiment is not intended to limit the scope of the invention, as any of numerous and other implementations of a data structure for storing service abstractions, for example, variations of data structure 600, are possible and are intended to fall within the scope of the invention.

FIG. 7 is a block diagram illustrating an example of a role data structure 700 for storing one or more roles. Such role data structure 700 may be a table of a relational database, an object of an object-oriented database, a record of a file, a combination thereof or other type of data structure. Data structure 700 may be included as part of relationship database 410 and may include one or more of the roles 424.

The data structure 700 may include a plurality of entries, including, but not limited to, entry 702. Each entry may include a plurality of fields, including name field 704, default VLAN field 706, default priority field 708, and service abstraction fields 710–714.

The name field 704 may specify a value for uniquely identifying a role. Default VLAN field 706 may store a value specifying a default VLAN to be associated with a role in one of the following circumstances (described in more detail in the following paragraph): the role does not include any service abstractions; the role does not include any service abstractions that include any packet rules; the role does not include any service abstractions that include any packet rules that specify a VLAN to be assigned to the received packet; or a received packet does not satisfy any rules that specify a VLAN to be assigned to the received packet.

As described above, a first step in designing a relationship hierarchy for a network may be to define the roles. Thus, before service abstractions and packet rules are associated with the role, the value stored in default VLAN field 706 may serve as a default VLAN value to apply to a packet received at a device configured with the role. Similarly, if the role includes services, but none of the services include any packet rules, the default VLAN value stored in field 706 for a role may be used by a device to assign a VLAN to a packet. Further, even if there are packet rules associated with a role, if none of the packet rules are satisfied by a received packet, the value stored in default VLAN field 706 may be assigned to the received packet.

Default priority field 708 may store a value to be used as a default priority value to be assigned to a packet in any of the same scenarios described above in relation to default VLAN field 706.

Each of fields 710–714 may store a value representing a name of a service abstraction, and each of these fields may serve as an index or key to an entry (e.g., entry 602) of service data structure 600.

Field 704 of entry 702 specifies that this role is named "Engineering." This role may correspond to an engineering department of a company and/or one or more subnetworks of the communications network associated with the engineering department. Field 706 of entry 702 specifies that the default VLAN for the engineering role is VLAN 5. Field 708 of entry 702 specifies that there is not a default COS for the engineering role.

Each of service abstraction fields 710–714 specifies a service abstraction included in the Engineering role. For example, service abstraction field 714 specifies that the "Contain IP Eng Subnet Traffic" service abstraction represented by entry 602 of service data structure 600 is included in the Engineering role.

Data structure 700 is an illustrative embodiment of a data structure for storing one or more roles. Such illustrative embodiment is not intended to limit the scope of the invention, as any of numerous other implementations of a data structure for storing one or more roles, for example, variations of data structure 700, are possible and are intended to fall within the scope of the invention.

Returning to FIG. 4, the relationship management module 406 may be configured to edit one or more relationship hierarchies 423. As used herein, "editing" includes, but is not limited to, creating, storing, accessing, modifying and deleting. The relationship management module 406 may include a role editing module 412, a service editing module 414 and a rule editing module 416.

The rule editing module 416 may be configured to edit one or more packet rules 428 of the relationship database 410. The rule editing module 416 may be configured to receive user input 404, for example, from a mouse, keyboard, trackball, etc., and to edit a packet rule 422 in accordance with the user input 404, including storing the packet rule in relationship database 410. The rule editing module 416 may be configured to add, modify, or delete any information described below in relation to fields 504–522 of an entry 502 of a packet rule data structure 500.

The rule editing module 416 may be configured to provide a graphical user interface to edit packet rules. For example, FIG. 8 is a screen shot illustrating an example of a graphical user interface for editing a packet rule, including adding, modifying and deleting information pertaining to a condition of a packet rule.

Figure 9:
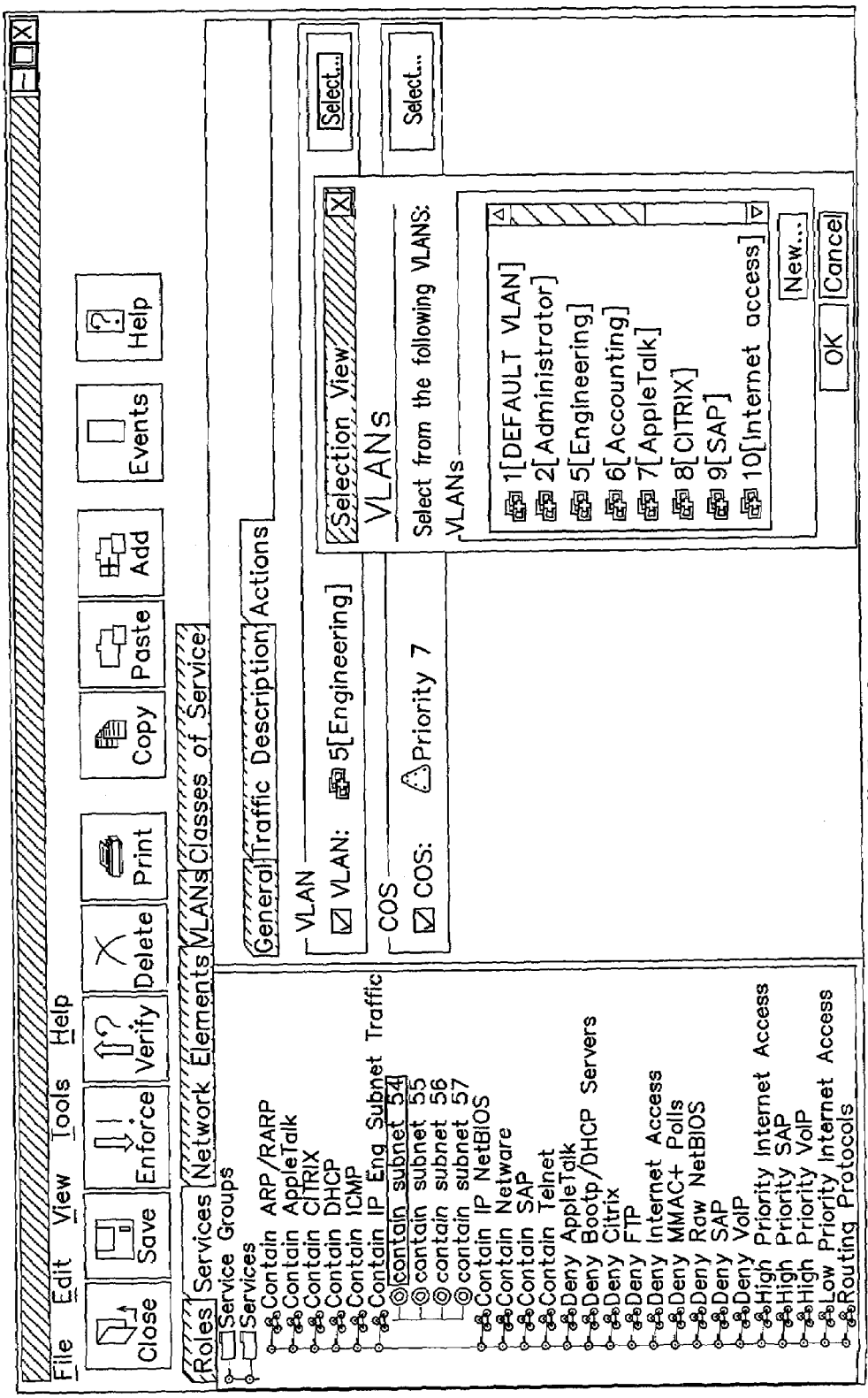
FIG. 9 is a screen shot illustrating an example of a graphical user interface for editing a packet rule.

FIG. 9 is a screen shot illustrating another example of a graphical user interface for editing a packet rule, including adding and modifying information pertaining to an action to be performed if the condition of a packet rule is satisfied.

Returning to FIG. 4, the service editing module 414 may be configured to edit one or more service abstractions 426 of the relationship database 410, including accessing one or more packet rules 428 and adding and removing such packet rules from a service. The service editing module 414 may be configured to receive user input and edit a service abstraction 420 in accordance with the user input, including storing the service abstraction in relationship database 410. The service editing module may be configured to add, modify, or delete any of the information referred to above in relation to fields 604–612 of an entry 602 of a service data structure 600.

Figure 10:
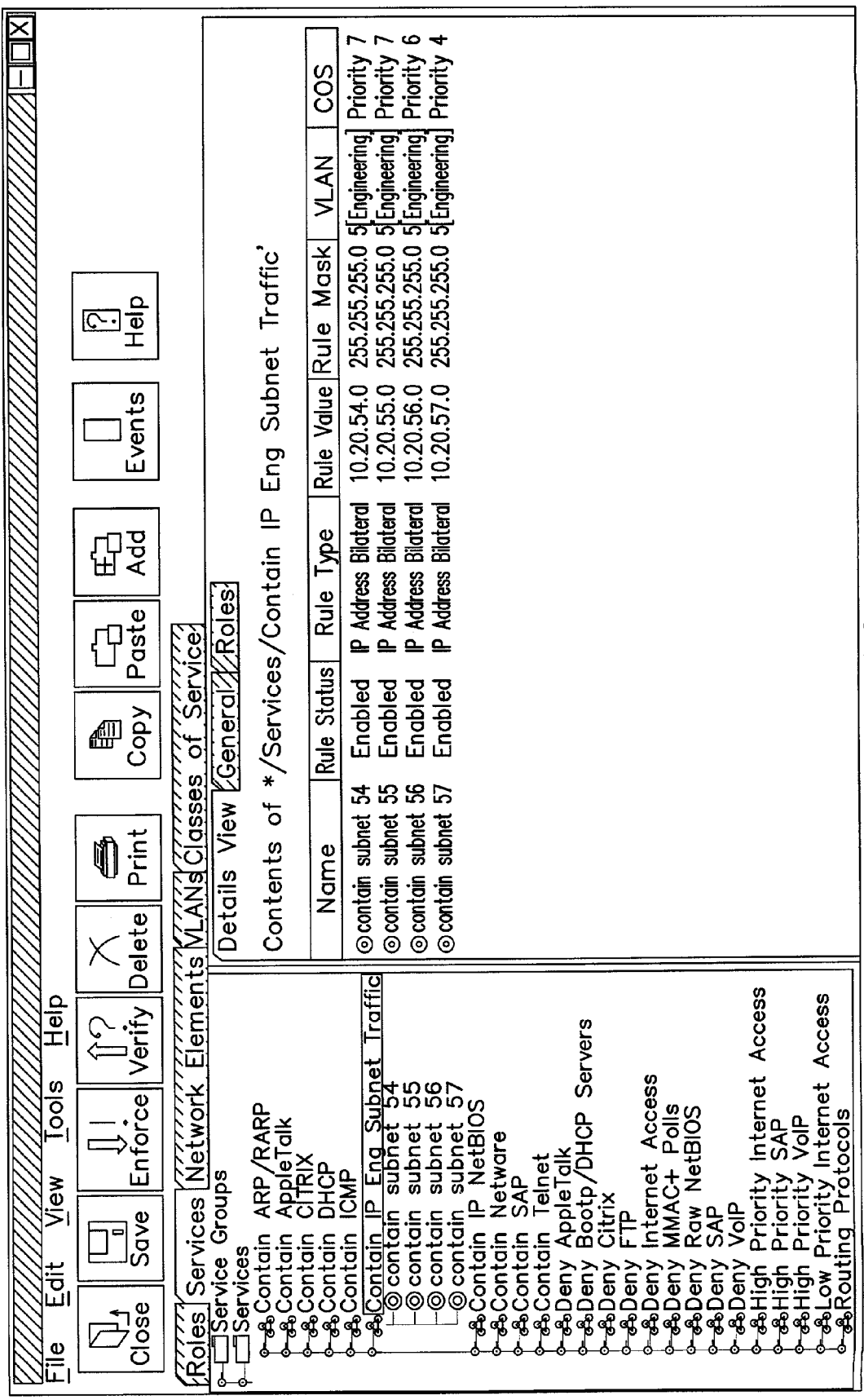
FIG. 10 is a screen shot illustrating an example of a graphical user interface for editing one or more service abstractions.

The service editing module 414 may be configured to provide a graphical user interface to edit service abstractions. For example, FIG. 10 is a screen shot illustrating an example of a graphical user interface for editing service abstractions.

Role editing module 412 may be configured to edit one or more roles 424 of the relationship database 410, including accessing one or more service abstractions 426 and adding or removing such service abstractions from a role. The role editing module 412 may be configured to receive user input 404 and edit a role 418 in accordance with the user input, including storing the role in relationship database 410.

The role editing module 412 may be configured to add, modify or delete any of the information described below in relation to fields 704–714 of an entry 702 of role data structure 700.

Figure 11:
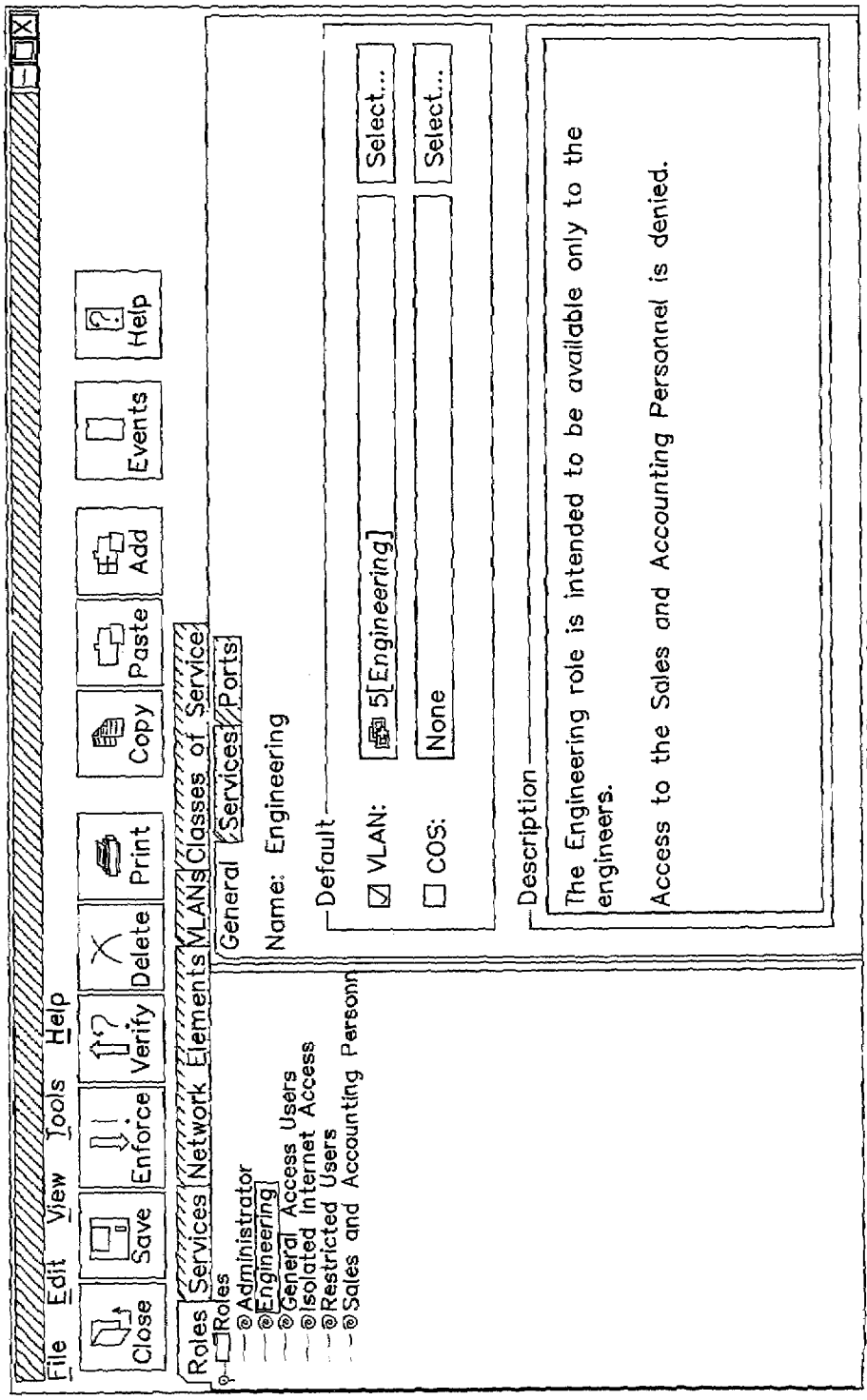
FIG. 11 is a screen shot illustrating an example of a graphical user interface for editing a role.

FIG. 11 is a screen shot illustrating an example of a graphical user interface for editing a role, including adding, modifying and deleting information pertaining to a default VLAN and a default COS of a role.

Figure 12:
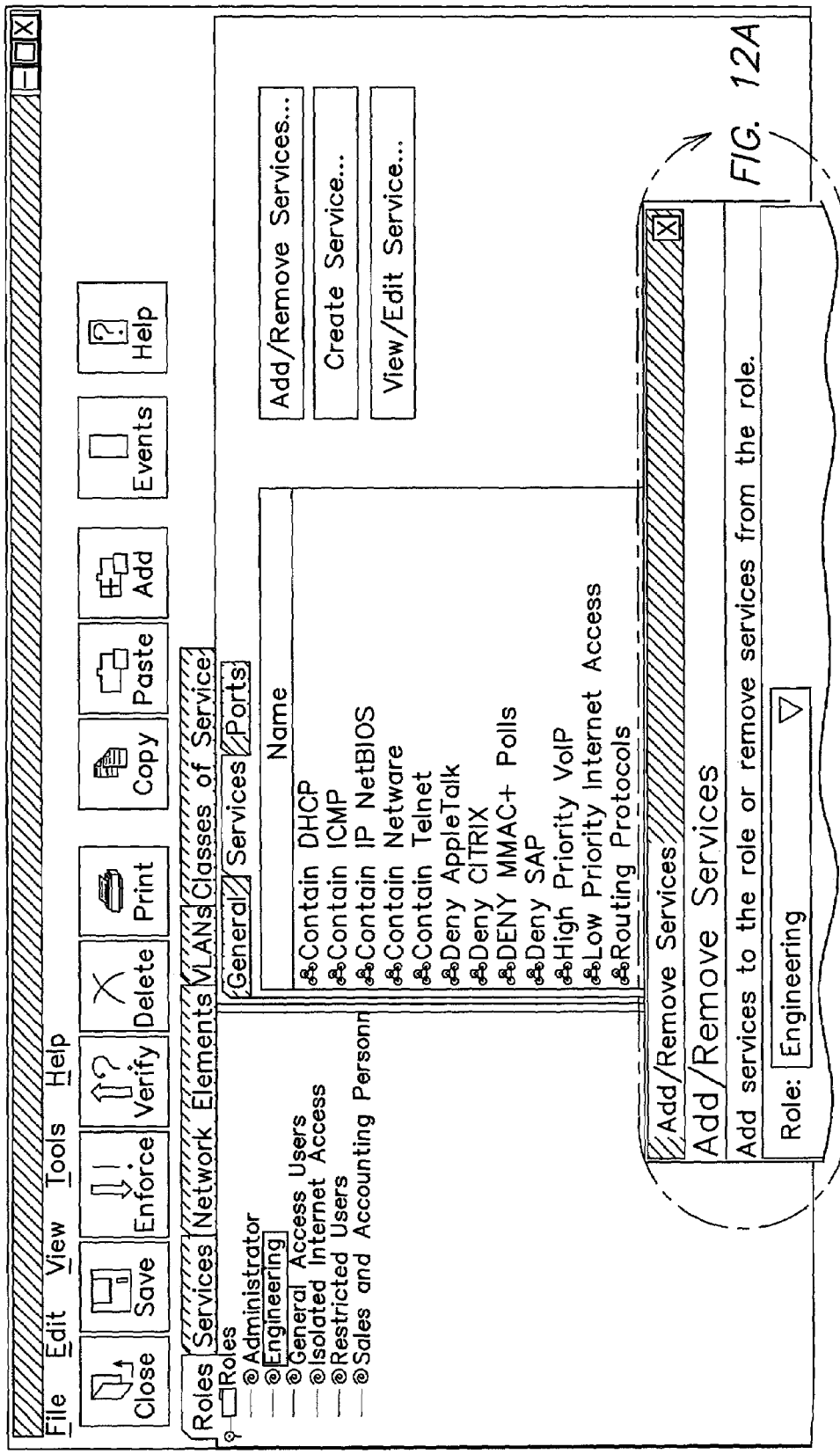
FIG. 12 is a screen shot illustrating an example of a graphical user interface for adding/removing service abstractions to/from a role.
Figure 12A:
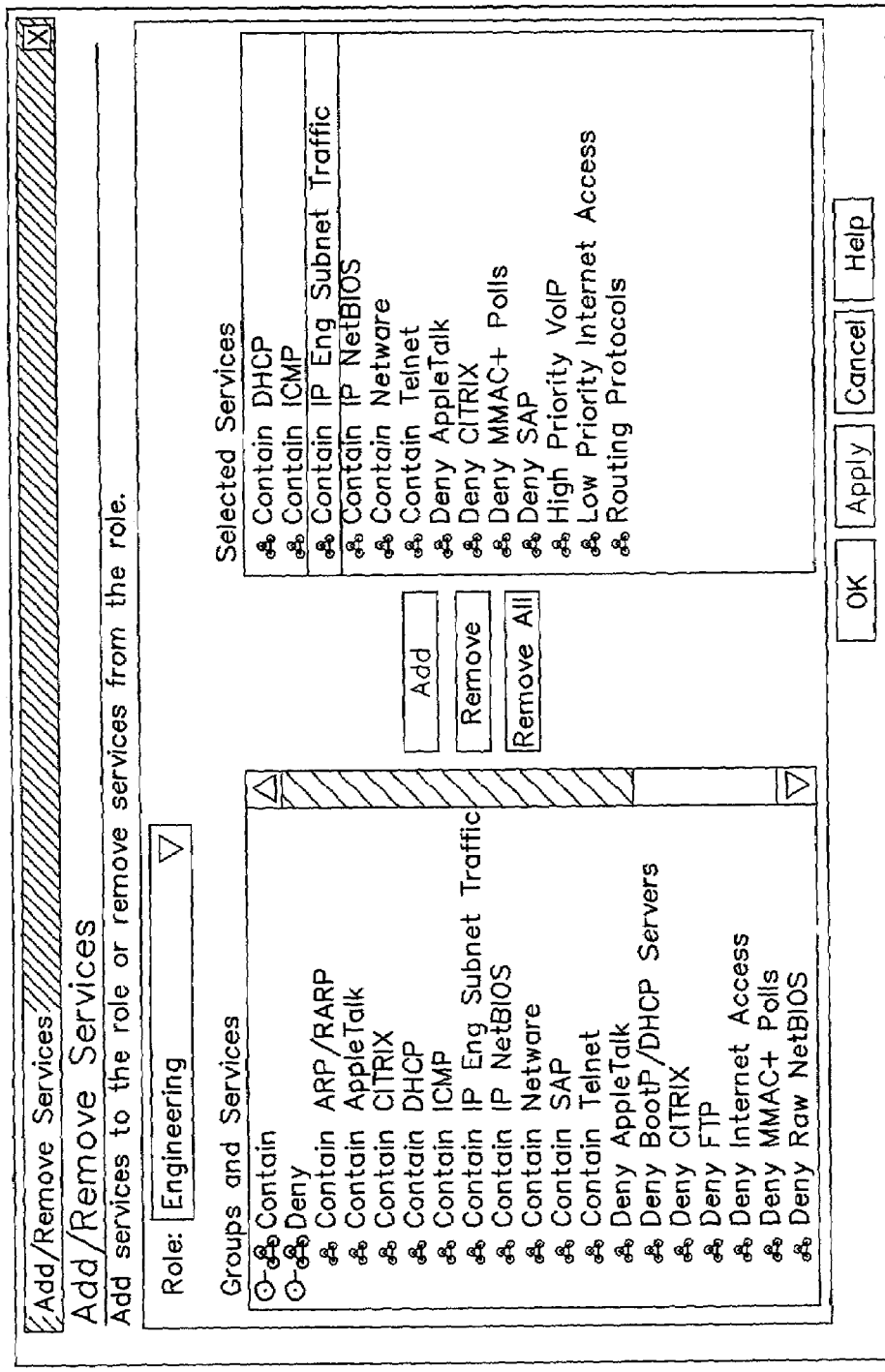

FIG. 12 is a screen shot illustrating an example of a graphical user interface for editing a role, including adding and removing service abstractions to a role.

Figure 1B:
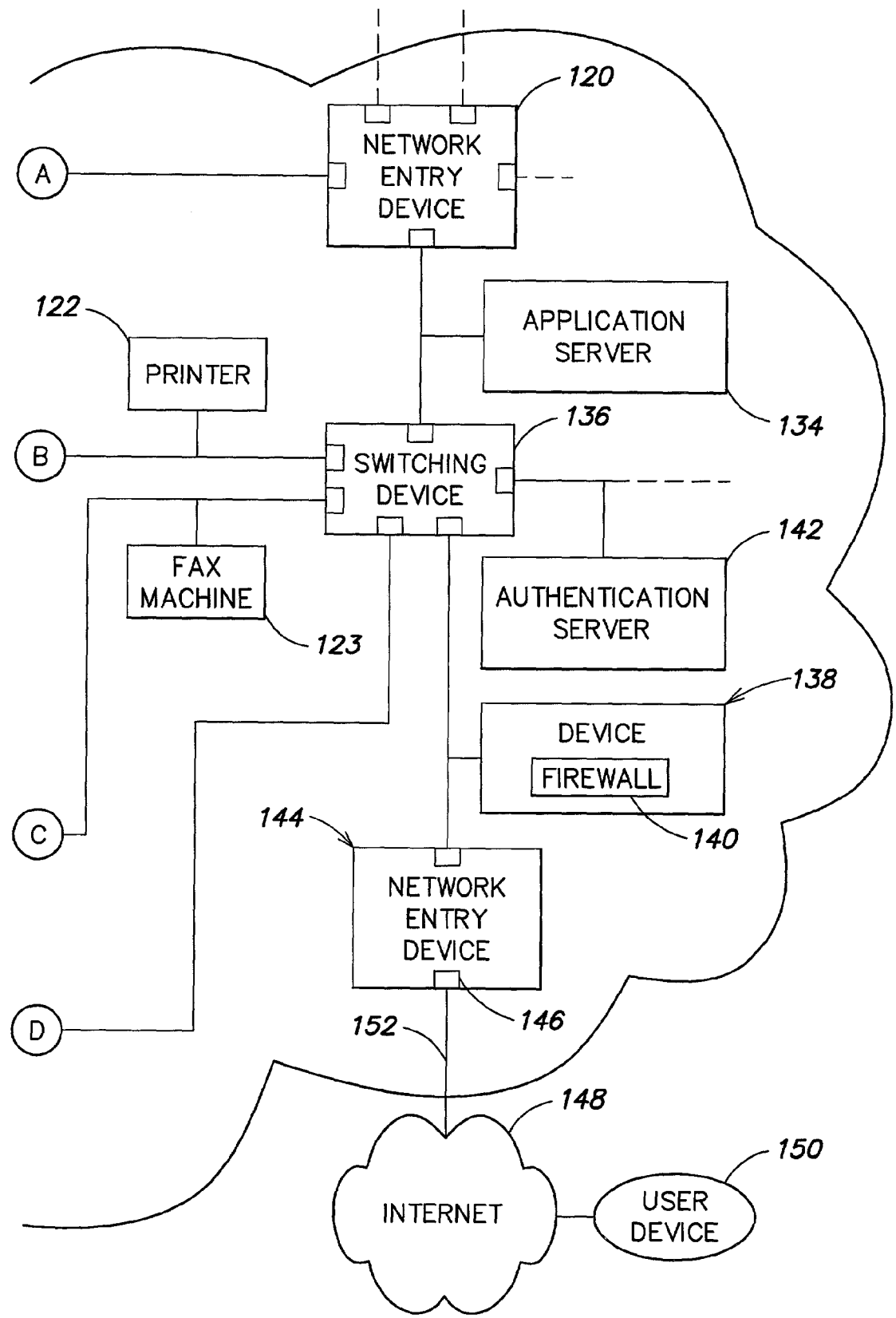

Returning to FIG. 4, the distribution module 408 may be configured to access one or more roles 430 from relationship database 410 and distribute one or more roles 432 to one or more devices of a network. For example, system 400 may reside on a user device, for example, one of the user devices of network 100, and distribution module 408 may be configured to distribute the roles 432 to any of the devices described above in relation to FIG. 1. Roles 432 then may be used to configure a component of a network device, for example, a port module or a firewall, as described below in more detail.

The roles 432 that are distributed may be different than the roles 424 stored in relationship database 410 and roles 430 retrieved therefrom. It may be desirable not to store a complete relationship hierarchy 423 upon other devices of network 100. Therefore, roles 432 may just represent a relationship between a role and one or more packet rules, but not include any service abstractions.

Alternatively, the distribution module 408 may be configured to retrieve one or more relationship hierarchies 423 from relationship database 410 and distribute these relationship hierarchies to one or more other devices of a network. Further, the distribution module may be configured to access one or more service abstractions 426 and/or one or more packet rules 428 and distribute these abstractions to one or more devices of the communications network.

System 400, and components thereof, may be implemented using software (e.g., C, C++, Java, or a combination thereof), hardware (e.g., one or more application-specific integrated circuits), firmware (e.g., electrically-programmed memory) or any combination thereof. For example, system 400 may be implemented using NetSight Policy Manager available from Enterasys Networks, Inc., of Rochester, N.H. One or more of the components of system 400 may reside on a single machine (e.g., a user device), or each component may reside on a different machine. Further, each component may be distributed across multiple machines, and one or more of the machines may be interconnected.

Further, on each of the one or more machines that include one or more components of system 400, each of the components may reside in one or more locations on the machine. For example, different portions of the components 406, 408 and 410 may reside in different areas of memory (e.g., RAM, ROM, disk, etc.) on the machine. Each of such one or more machines may include, among other components, a plurality of known components such as one or more processors, a memory system, a disk storage system, one or more network interfaces, and one or more busses or other internal communication links interconnecting the various components.

System 400 is an illustrative embodiment of a system for editing and distributing a relationship hierarchy. Such illustrative embodiment is not intended to limit the scope of the invention, as any of numerous other implementations of a system for editing and distributing a relationship hierarchy, for example, variations of system 400, are possible and are intended to fall within the scope of the invention.

Roles and service abstractions provide a mechanism for aggregating one or more packet rules into a single re-usable entity. Service abstractions utilize the understanding that complex configuration parameters often are used repeatedly throughout a network, and that groups of packet rules may be related to each other and deployed in concert to create a desired result.

In addition to aggregating multiple rules, roles and service abstractions provide the ability for technological concepts embodied in packet rules to be represented in a less technical, or non-technical way.

Roles and service abstractions may ease the configuration, implementation, and administration of packet rules and network policy by enabling the reuse, storage, and modification of an aggregation of one or more packet rules. Instead of configuring each existing or new device in a network individually, roles and service abstractions can be used and re-used to configure a number of devices, concurrently if desired, regardless of location in the network.

Roles and service abstractions allow a network administrator to aggregate complex technological configuration parameters providing translation between the languages of technical and non-technical members of an organization. Further, a non-technical user does not need to understand the technical details of what is being configured to interact with the network using non-technical roles and service abstractions. This allows members of an organization, both technical and non-technical, to gain an understanding of the complexities of the network system and have a voice in the specifics of its deployment.

Roles and service abstractions ease the complexity of configuring a network of any size, and facilitate communications between technical and non-technical members of the business. Further, roles and service abstractions enable an understanding of the relationships between users, a network and services provided on the network.

Having now described relationship hierarchies, including roles, service abstractions and packet rules, configuring a port module of a network device based on respective identities of one or more users to control usage of network resources by the one or more users will now be described. Although configuring a port module is described below mostly in relation to the use of roles, services and packet rules, other techniques may be used to configure a port module based on respective identities of one or more users to control usage of network resources by the users. Further, although configuring a port module based on respective identities of one or more users is described below mostly in relation to configuring an entry port module of a network entry device, such configuring may be performed on any port module of any network device and on firewalls.

Figure 13B:
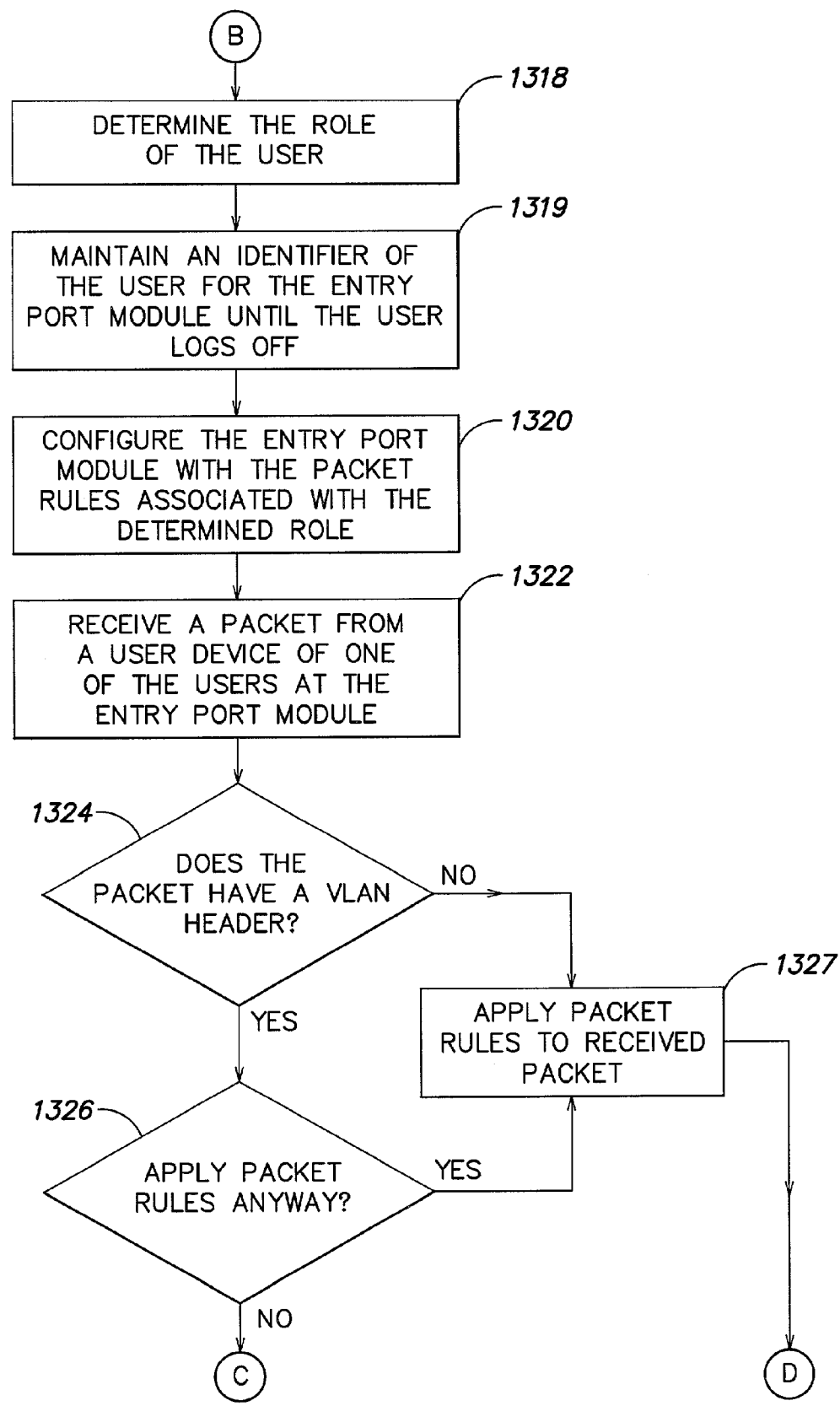
Figure 13C:
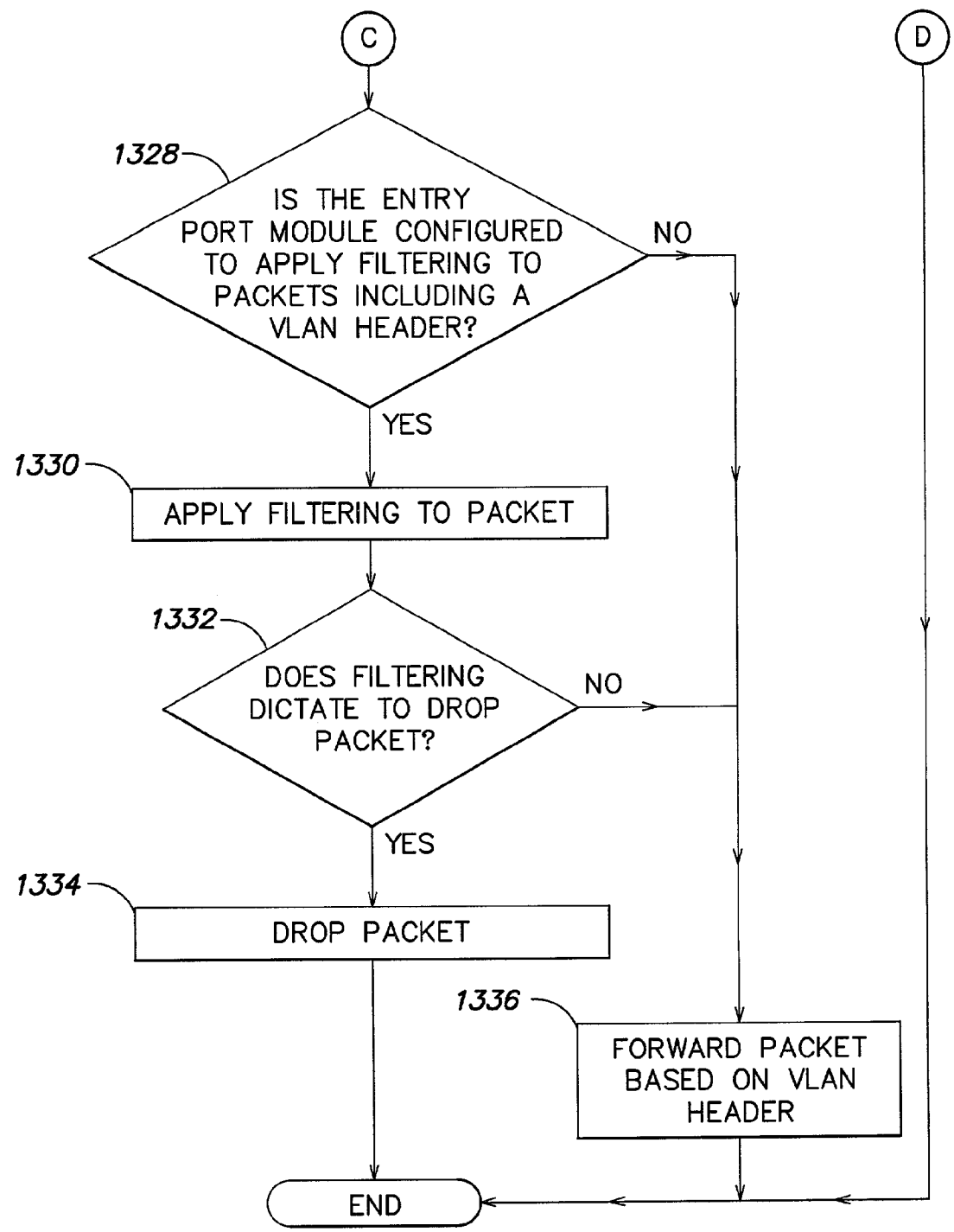

FIGS. 13A–13C comprise a flow chart illustrating an example of a method 1300 of configuring an entry port module of a network device based on the respective identities of one or more users to control usage of network resources by such users. Although methods 1300 and 1400 below are primarily directed to configuring an entry port module of a network device based on the respective identities of one more users, the invention is not limited as such, as other components of network devices, for example, a firewall resident on a network device, may be configured based on the respective identities of one or more users similar to as described below for port modules.

Further, it should be understood that methods 1300 and 1400 may be applied to configure individual virtual ports of a port module according to an identity of a user, for example, if the physical port of the port module of a wireless switching device (described below in more detail in relation to system 1500 of FIG. 15) and is connected to multiple user devices by a shared wireless transmission medium. Thus, multiple virtual ports of a port module may be configured differently, and may be configured according to different user identities.

In Act 1301, a state of one or more port modules of a network entry device may be configured. For example, a port module may be configured to have an "authentication off/port on" state, where authentication is not required for a user to transmit packets onto the network and use the network resources. For a port module configured as such, Acts 1310–1336 of method 1300 may not be performed.

A port module may be configured to have a state of "authentication on/port off", where a user must authenticate before using any network resources. Thus, a user cannot send any packets onto the network or receive any packets from the network until the user has successfully authenticated.

A port module of the network entry device may be configured with a state of "authentication on/port on with default behavior", where a user may be allowed to use some network resources before authentication or in the event of a failed authentication. For example, a network administrator may decide that all users should have access to some basic network services, such as access to the Internet or access to a word processing application, but not access to other network resources. Further, this state may be defined such that a port module that does not have an authenticated user attached thereto may be restricted such that all packets received at the port module and/or transmitted from the port module are assigned a lower priority, until a user is authenticated on the port module.

In Act 1302, one or more roles with respect to the communications network are created, each role associated with one or more packet rules. Such roles may be created as described above in relation to FIGS. 2–4, 7, 11 and 12.

In Act 1303, one or more port modules of the network entry device may be configured with a default role (i.e., one or more default packet rules) that define default behavior for the port module. For example, a port module may be configured to assign a certain priority or VLAN to all packets received at the port module until the port module has been configured based on the respective identities of one or more users. Further, a default role may be configured for a port module for which authentication capability has not been enabled. Such default role configuring may be desirable for network devices that do not require authentication or are incapable of authentication, for example, printers, fax machines, and legacy devices such as software-based routers and shared hubs.

Next, in Act 1304, the one or more roles are distributed to one or more network devices on the communications network. Such network devices may include any of a variety of types of network devices, including switching devices that may be serving as a network entry device of the communications network.

In a following Act 1306, a respective role is assigned to one or more users of the communications network. The same role may be assigned to several users of the communications network. For example, a network administrator may assign all employees belonging to a sales department of a business organization to a same role, for example, sales role 202 described above in relation to FIG. 2. One or more other roles may be assigned to one or more other users. By assigning a role to a user, one or more service abstractions are associated with the user. Alternatively or in addition to assigning a role to a user, one or more service abstractions may be assigned to the user.

In Act 1308, user information about the one or more users to which the respective roles are assigned may be stored on the communications network. This user information may include identification information of the user and the assigned role of the user. The identification information may include a user name, password, and other credentials of the user, for example, personal information about the user such as the user's social security number, birth date, or other piece of information. The user information may be stored in an authentication database, for example, authentication database 1508 described below in relation to FIG. 15.

Similarly as described above in relation to Acts 1302–1308, one or more service abstractions may be created, each service abstraction associated with one or more packet rules. These service abstractions then may be distributed to one or more network devices of the communications network. Next, one or more port modules of the network entry device may be configured with a default service abstraction. Next, one or more service abstractions may be assigned to one or more users of the communications network. In a following Act, for each such user, user information about the user may be stored on the communications network, where the user information includes identification information of the user and the assigned one or more service abstractions of the user.

In Act 1310, a login packet may be received from a device of one of the users at an entry port module of the network entry device, the login packet including identification information of the user. The login packet may be received in response to the user's device sending a signaling packet to the network entry device and the network entry device requesting login information.

Such user's device may be connected to the entry port module by any of a variety of transmission media, for example, a wireless transmission medium or a wire-based transmission medium, where the transmission medium may be dedicated to the user's device or shared with other user devices corresponding to other users.

The identification information included in the login packet may be similar to the identification information described above in relation to 1308, and may include a user name, password and other credential information corresponding to the user.

In a following Act 1312, the received identification information may be authenticated. Any of a variety of authentication techniques may be used to authenticate the received identification information, for example, RADIUS, a NOS login, or 802.1X. Other types of authentication techniques may be used. For example, referring to FIG. 15, an authentication database 1508 may be searched using user information 1526 for a user authentication entry 1528 corresponding to the identification information received in the login packet. If such user authentication entry 1528 is not found, the identification information may be deemed invalid. If such entry 1528 is found, then entry information 1529 may be sent from the authentication database to the authentication module 1506. If the identification information included in the entry information 1529 does not match the identification information of the login packet, the identification information of the login packet may be deemed invalid.

If a user authentication entry 1528 corresponding to the identification information of the login packet is found and the identification information of this entry matches the identification information of the login packet, then the identification information may be deemed valid. Authentication is described in more detail below in relation to FIG. 15.

If in Act 1314 it is determined that the identification information is invalid (e.g., it does not match any entry of an authentication database), then in Act 1316, the user may be denied access to the communications network. Whether or not the user is denied access may depend on the state defined for the entry port module in Act 1301.

If it is determined in Act 1314 that the identification information is valid, then in Act 1318, the role of the user may be determined. For example, the entry information 1529 extracted from authentication database 1508 may include a role identifier (ID) corresponding to the user, from which the authentication module may determine the role of the user. Alternatively, the authentication module may access another database that includes a plurality of entries, where each entry corresponds to a user and includes a role assigned to the user, from which the authentication module 1506 may determine the role of a user.

In Act 1319, an identifier of the user is maintained (e.g., stored) for the entry port module until the user logs off. Such user identifier may be stored in a list along with other user identifiers for other users that have been authenticated and are currently logged on to the port module. Such user identifier may be stored on a computer-readable medium accessible by the entry port module. The user identifier may be any information that was included in a login packet received from the user or any information included in the entry information retrieved from the authentication database for the user as described above in relation to Act 1314. The user identifier should include information that can be compared against information included in packets received at the entry port module, for example, a location identifier such as a MAC address or IP address or a device identifier. As will be described in more detail below in relation to Act 1401 of method 1400, for each packet received at the entry port module after performance of Act 1319, the user identifier may be accessed to determine an identity of the user of the user device from which the packet was received.

In a following Act 1320, the entry port module may be configured with the packet rules associated with the determined role. The entry port module may remain configured as such until the user logs off. The entry port module may be dedicated to the user such that any packets received at the entry port module from a device other than the user device is dropped, until the user logs off. This is described in more detail below in relation to Act 1322.

In an embodiment, Acts 1310–1320 may be repeated for one or more other users, for example, if the port module is connected to a transmission medium that is shared between one or more users. This results in the port module being configured with packet rules corresponding to a plurality of users. It should be appreciated that some of these users may have the same role and therefore, as described in more detail below, may have the same packet rules applied to packets received from their user devices. It should also be appreciated that even users that do not have a same role may have one or more (possibly all) of the same packet rules associated with them and subsequently applied to packets received from them.

As described above in relation to 1304, one or more roles (and/or service abstractions) may have been distributed to the network entry device. Accordingly, Act 1320 may include configuring the entry port module with the one or more packet rules corresponding to one or more of the roles and/or service abstractions that were distributed to the network entry device in Act 1304.

In addition to or as an alternative to Acts 1318 and 1320, one or more service abstractions corresponding to a user may be determined, and the entry port module may be configured with the packet rules associated with the one or more determined service abstractions. As described above in relation to distribution module 408 of FIG. 4, in addition to or as an alternative to distributing roles 432 to devices of a network, one or more relationship hierarchies and/or service abstractions also may be distributed. Thus, entries of authentication database 1508 or another database accessible by the authentication module 1506 may specify the one or more service abstractions assigned to a user, and this information may be used to determine the one or more service abstractions assigned to a user and to configure the entry port module with the packet rules associated with these one or more service abstractions, as similarly described in relation to Acts 1318 and 1320 with respect to the assigned role of a user.

In Act 1322, a packet may be received from a user device of one of the users at the entry port module, for example, to initiate an application between the user device and a device of the communications network in accordance with an application already being executed.

The packet received in Act 1322 may be from any device coupled to the entry port module. The entry port module may be connected to a plurality of user devices by a shared transmission medium. In an embodiment, if the entry port module is connected to multiple user devices, it may be desirable to configure the port module to drop any received packets that are not from a specific user's device until such user logs off of the port module. For example, one of the packet rules associated with the role of such user may be defined to examine the MAC source address and/or IP source address included in each received packet and to drop the packet if it is not equal to the MAC address and/or IP address, respectively, of the user, which may have been stored for the entry port module as part of Act 1319. Thus, if the port module is connected to a transmission medium dedicated to a user, the port module may use an address of the user's device (or other information specific to the user while the user is logged on) to filter out packets received from other users, for example, from addresses other than the one or more addresses recorded for the authenticated user, until the user logs off.

In an embodiment of method 1300, following Act 1322, packet rules, including the packet rules corresponding to the user from which the packet was received (i.e., user-based packet rules) and default rules, may be applied to the received packet in Act 1327 as described below in relation to FIG. 14.

In an alternative embodiment, after Act 1322, it may be determined in Act 1324 whether the packet has a VLAN header. If it is determined that the packet does not have a VLAN header, then Act 1327 may be performed. Alternatively, if the packet does have a VLAN header, then in Act 1326 it may be determined whether to apply the packet rules anyway. If it is determined in Act 1326 to apply the packet rules anyway, then Act 1327 may be performed.

If it is determined in Act 1326 to not apply the packet rules, then in Act 1328, it may be determined whether the entry port module is configured to apply filtering rules to packets including a VLAN header. For example, an entry port module may be configured to apply filtering rules, in accordance with IEEE 802.1D, to a received packet to determine whether to drop (i.e., filter) a packet based on the VLAN specified in the header. The filtering rules may specify that a packet received at that port is not permitted to be transmitted to the VLAN specified in the header, and thus the packet is to be dropped.

If it is determined in Act 1328 that the entry port module is not configured to apply filtering to packets including a VLAN header, then, in Act 1336, the packet may be forwarded based on the VLAN header, for example, in accordance with IEEE 802.1D and/or IEEE 802.1Q.

If it is determined that the entry port module is configured to apply filtering to packets including a VLAN header, then in Act 1330, filtering may be applied to the packet. In Act 1332, it may be determined whether the filtering dictates to drop the packet, for example, for reasons described above in relation to 1328. If it is determined to drop the packet in Act 1332, then the packet may be forwarded based on the VLAN header in Act 1336.

If it is determined in Act 1332 that filtering dictates to drop the packet, then the packet may be dropped in Act 1334.

Acts 1322–1336 may be repeated for a user until the user has logged off, or the connection between the user's device and the port module is terminated for some other reason. In response to a user logging off or the connection being terminated, the packet rules associated with the user may be de-configured from the entry port module.

Depending on the configuration of the entry port module, for example, as described above in relation to Acts 1301 and 1303, after all users connected to the entry port module have logged off, the entry port module then may apply packet rules corresponding to a default role or one or more default services, and may apply other rules to all received packets, until another user authenticates at the entry port module. Alternatively, all packets may be denied access (e.g., dropped) to the communications network until another user authenticates at the entry port module.

In an embodiment of method 1300, various acts of method 1300 and/or part thereof are performed as described in *Enterasys User Personalized Network*, a white paper available from Enterasys Networks, Inc., available on the filing date of this application at http://www.enterasys.com/products/whitepapers, the entire contents of which is hereby incorporated by reference.

Method 1300 may include additional acts. Further, the order of the acts performed as part of method 1300 is not limited to the order illustrated in FIGS. 13A–13C, as the acts may be performed in other orders, and one or more of the acts of method 1300 may be performed in series or in parallel to one or more other acts, or parts thereof. For example, Act 1320 may be performed before or concurrently with Act 1319.

Method 1300 is an illustrative embodiment of a method of controlling usage of network resources by one or more users beyond the users' entry point to a network based on the respective identities of the users. Such illustrative embodiment is not intended to limit the scope of the invention, as any of numerous other implementations of such method, for example, variations of method 1300, are possible and are intended to fall within the scope of the invention.

Method 1300, acts thereof and various embodiments and variations of these methods and acts, individually or in combination, may be implemented as a computer program product tangibly embodied as computer-readable signals on a computer-readable medium, for example, a non-volatile recording medium, an integrated circuit memory element, or a combination thereof. Such computer program product may comprise computer-readable signals tangibly embodied on the computer-readable medium, where such signals define instructions, for example, as part of one or more programs, that, as a result of being executed by a computer, instruct the computer to perform one or more of the methods or acts described herein, and/or various embodiments, variations and combinations thereof. Such instructions may be written in any of a plurality of programming languages, for example, Java, Visual Basic, C, or C++, Fortran, Pascal, Eiffel, Basic, COBAL, etc., or any of a variety of combinations thereof. The computer-readable medium on which such instructions are stored may reside on one or more of the components of network 100 described above in relation to FIG. 1 and/or system 1500 described below in relation to FIG. 15, and may be distributed across one or more of such components.

Figure 14B:
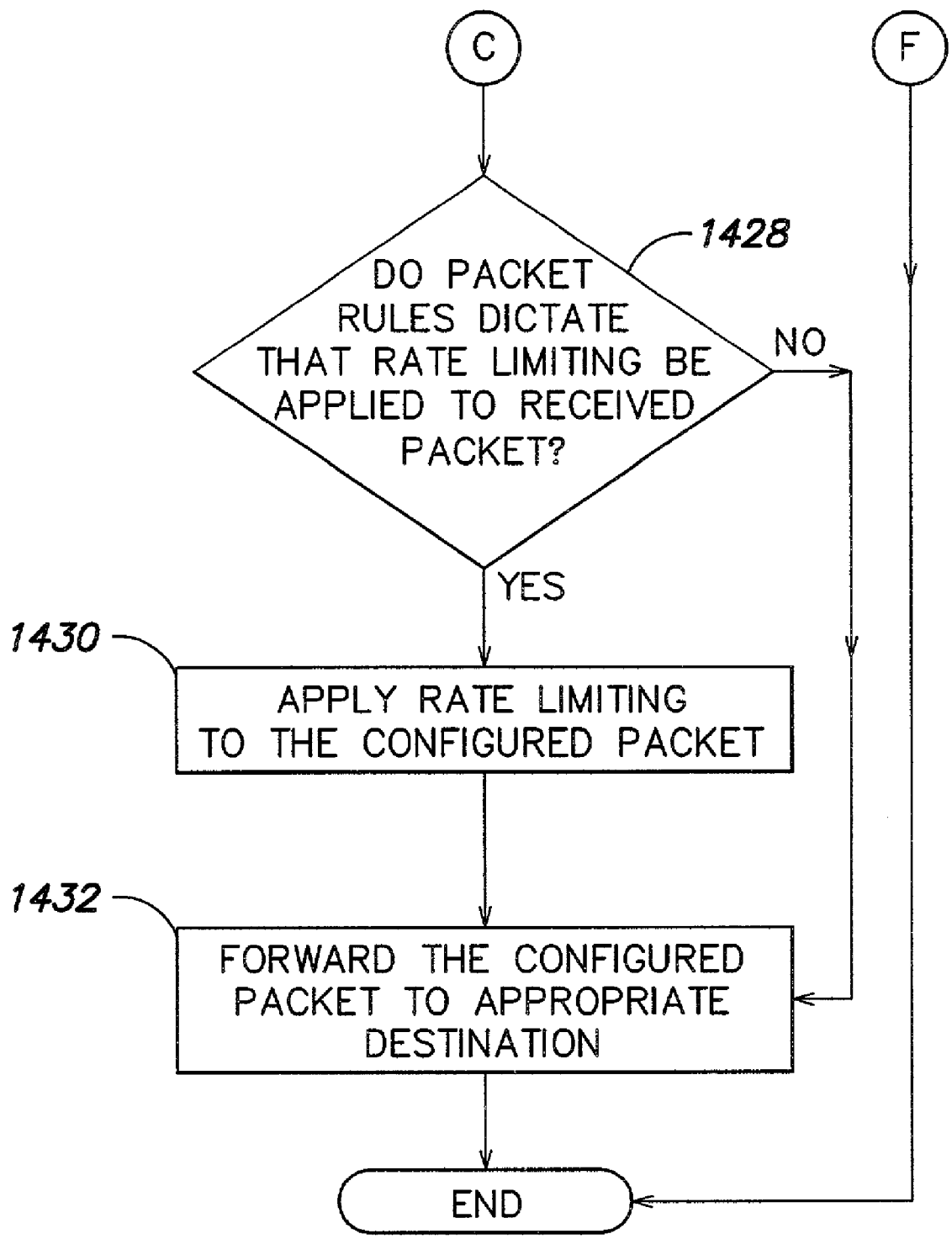

FIGS. 14A and 14B comprise a flow chart illustrating an example of a method 1400 for performing Act 1327.

In Act 1401, an identity of a user of the user device from which the packet was received is determined. For example, information from the received packet may be compared against a list of user identifiers maintained by the entry port module as a result of performing Act 1319. For example, Act 1319 may include storing a MAC address and/or an IP address of a user device of a user, where such information was obtained from an authentication packet received from the user device of the user, and Act 1319 may be repeated for a plurality of users. Accordingly, Act 1401 may include extracting the MAC address and/or IP address of the received packet and comparing it to one or more of the MAC addresses and/or IP addresses maintained on the entry port module.

If such identity cannot be determined, for example, because the information in the received packet does not match any of the user identifiers maintained by the entry port module, then the packet may be dropped (not shown) and method 1400 may end. Alternatively, if the identity is determined, then method 1400 may proceed to Act 1402.

In Act 1402, the user-based packet rules are applied to the received packet. The user-based packet rules are packet rules corresponding to an identity of the user, for example, the one or more packet rules associated with the role or one or more service abstractions corresponding to the user. A user-based packet rule is distinguished from a default packet rule or any other type of rule that is not based on an identity of a user.

In Act 1404, it may be determined whether the user-based packet rules dictate to drop the received packet. If the user-based packet rules dictate to drop the packet, then in Act 1406, the packet is dropped and the method ends.

If in Act 1404 it is determined that the user-based packet rules do not dictate to drop the packet, then in Act 1408 it may be determined whether there is any required information that is not assigned by the user-based packet rules. For example, the entry port module may be configured such that certain information is required, for example, a VLAN and/or a priority. If it is determined in Act 1408 that there is not any required information that has not been assigned by the user-based packet rules, then in Act 1410, the received packet may be configured according to the user-based packet rules. For example, a VLAN header may be configured to include a specific VLAN and/or priority based on the packet rules.

In a following Act 1428, it may be determined whether the packet rules dictate that rate limiting is to be applied to the received packet. An entry port module may be configured to apply one or more rate limiting techniques, known now or later developed. Rate limiting is described above in more detail in relation to rate limit field 520 of packet rule data structure 500 of FIG. 5.

If it is determined in Act 1428 that rate limiting is not to be applied to the received packet, then in Act 1432, the configured packet may be forwarded to the appropriate destination. The appropriate destination may be determined from information already included in the received packet, information added or changed by application of the packet rules, or a combination thereof.

If it is determined in Act 1428 that the packet rules dictate that rate limiting be applied to the received packet, then in Act 1430 rate limiting may be applied to the received packet.

Returning to Act 1408, if it is determined that there is required information that has not been assigned by the user-based packet rules, then in Act 1416 it may be determined whether the entry port module is configured with any default packet rule. Default packet rules are described above in more detail in relation to Act 1303 of method 1300 of FIG. 13A. For example, an entry port module may be configured to assign a default priority to all packets received at the entry port module.

If it is determined in Act 1416 that the entry port module is not configured with any default packet rules, then, in Act 1418, the packet may be configured based on user-based packet rules and possibly other additional rules with which the entry port module is configured. For example, even though an entry port module may not be configured with default packet rules, the entry port module may be configured to apply rules in accordance with known or later developed technologies, for example, IEEE 802.1D and/or 802.1Q. The method then may proceed to Act 1428, which is described above.

If in Act 1416 it is determined that the entry port module is configured with default packet rules, then the default packet rules may be applied to the received packet in Act 1420.

In a following Act 1422, it may be determined whether any required information still has not been assigned by application of the user-based packet rules and default-based packet rules. If it is determined that there is no required information still not assigned, then in Act 1426, the received packet may be configured based on the user-based packet rules and default packet rules, and the method may proceed to Act 1428.

If it is determined in Act 1422 that there is still required information not yet assigned, then in Act 1424, the packet will be configured based on the user-based packet rules and default packet rules applied in Acts 1402 and 1420, respectively, and any other additional rules with which the entry port module is configured. The method then may proceed to act 1428.

Thus, application of method 1400 to a received packet may result in a packet being configured based on user-based packet rules, default packet rules, and other additional rules with which the entry port module is configured. For example, the user-based packet rules may have assigned a VLAN to the received packet, the default packet rules may have assigned a priority to the received packet, and other rules may have applied rate limiting to the packet.

Method 1400 may include additional acts. Further, the order of the acts performed as part of method 1400 is not limited to the order illustrated in FIG. 14 as the acts may be performed in other orders, and one or more of the acts of method 1400 may be performed in series or in parallel to one or more other acts, or parts thereof.

Method 1400 is an illustrative embodiment of applying packet rules to a packet received at an entry port module. Such illustrative embodiment is not intended to limit the scope of the invention, as any of numerous other implementations of applying packet rules to a packet received at a port module, for example, variations of method 1400, are possible and are intended to fall within the scope of the invention.

Method 1400, acts thereof and various embodiments and variations of these methods and acts, individually or in combination, may be implemented as a computer program product tangibly embodied as computer-readable signals on a computer-readable medium, for example, a non-volatile recording medium, an integrated circuit memory element, or a combination thereof. Such computer program product may comprise computer-readable signals tangibly embodied on the computer-readable medium, where such signals define instructions, for example, as part of one or more programs, that, as a result of being executed by a computer, instruct the computer to perform one or more of the methods or acts described herein, and/or various embodiments, variations and combinations thereof. Such instructions may be written in any of a plurality of programming languages, for example, Java, Visual Basic, C, or C++, Fortran, Pascal, Eiffel, Basic, COBAL, etc., or any of a variety of combinations thereof. The computer-readable medium on which such instructions are stored may reside on one or more of the components of network 100 described above and/or system 1500 described below, and may be distributed across one or more of such components.

Figure 15A:
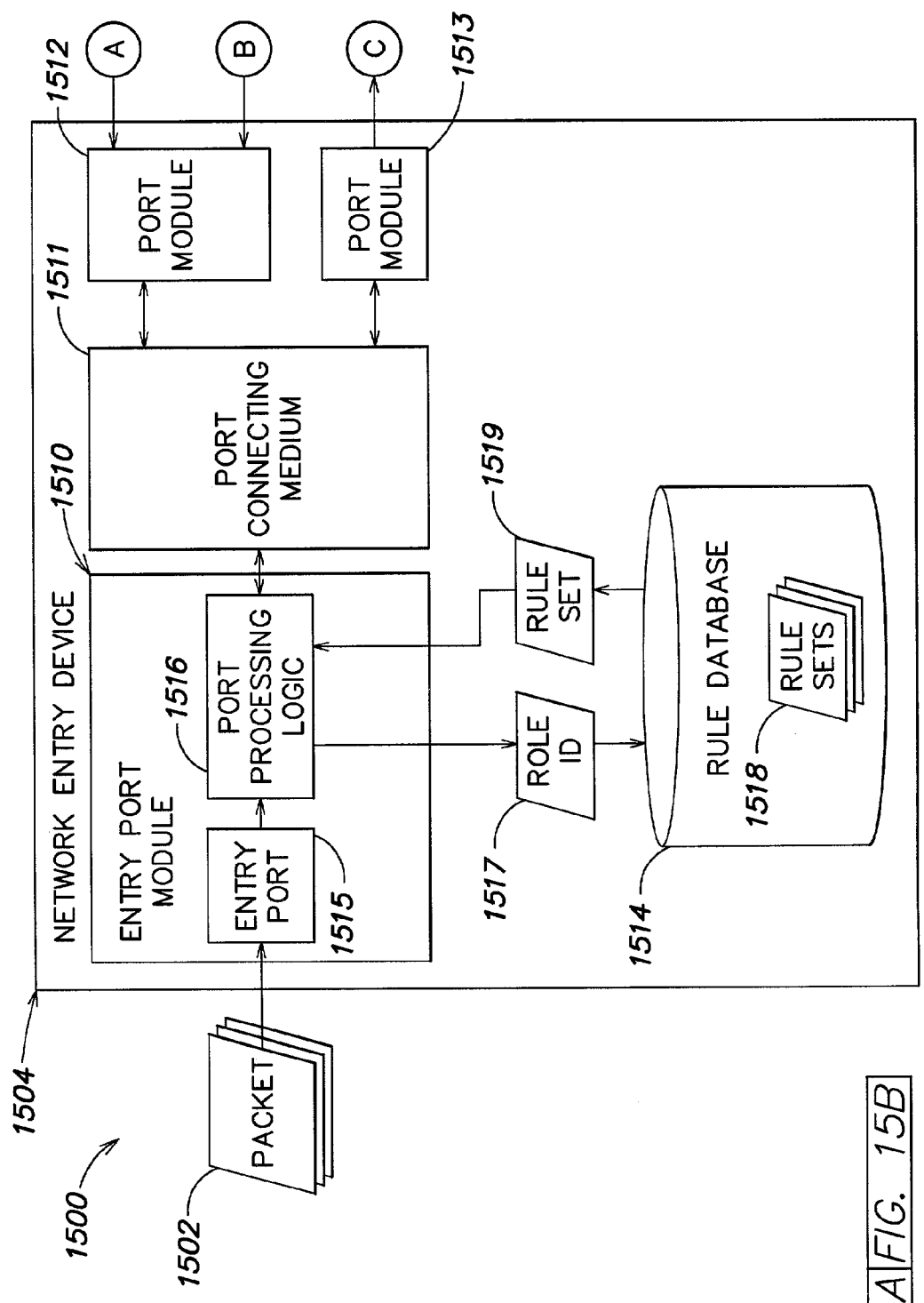
FIG. 15 is a block diagram illustrating an example of a system for controlling usage of network resources by one or more users at such users' entry point to a communications network.
Figure 15B:
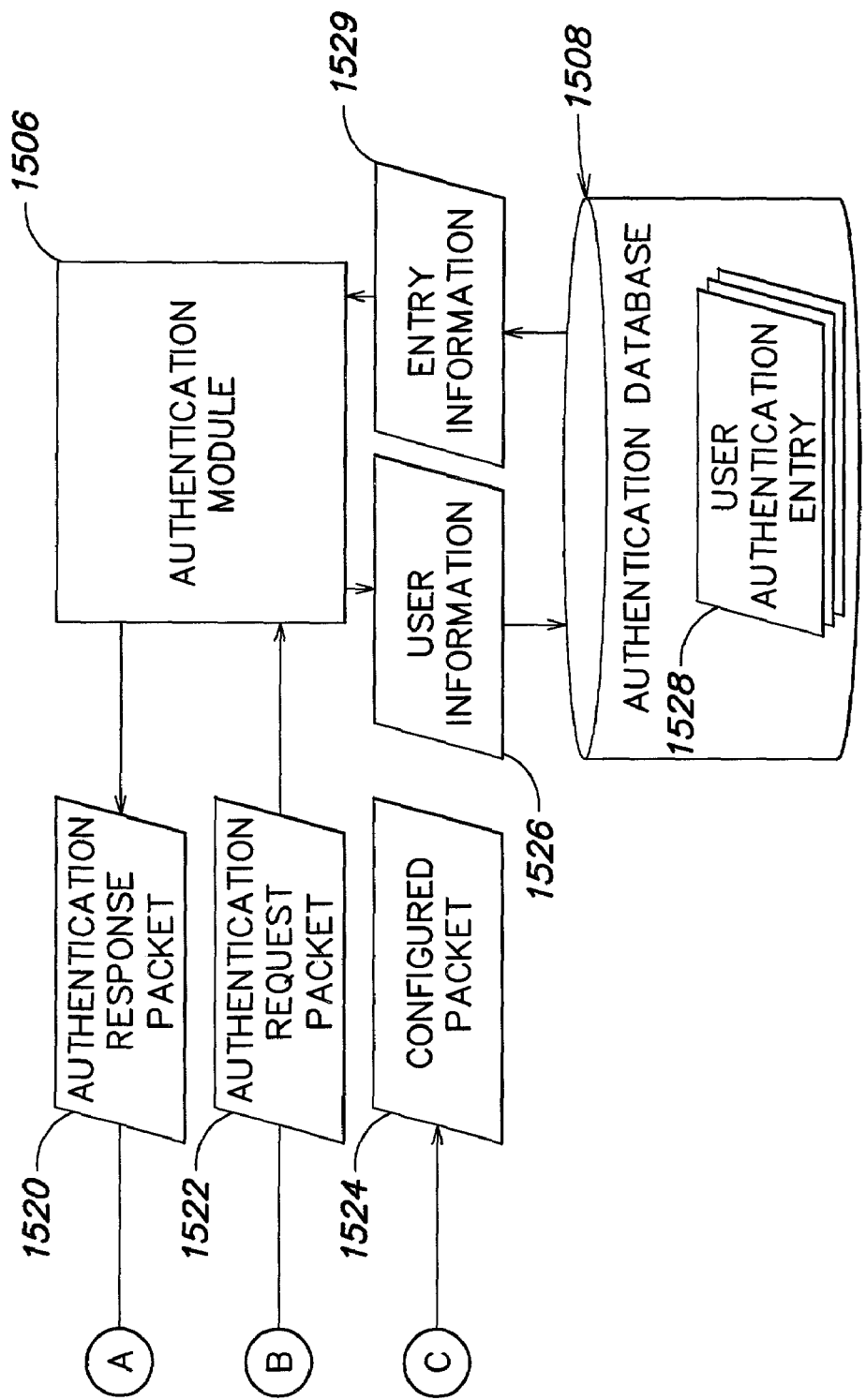

FIG. 15 is a block diagram illustrating an example of a system 1500 for controlling usage of network resources by one or more users beyond such users' entry point to a communications network based on the respective identities of one or more users. The system 1500 may include a network entry device 1504, a authentication module 1506 and an authentication database 1508. Although authentication module 1506 and authentication database 1508 are shown as not being part of network entry device 1504 in FIG. 15, module 1506 or database 1508 or both may be part of network entry device 1504.

Although system 1500 illustrates an entry port module 1510 of a network entry device 1504 configured to control usage of network resources by one or more users based on the respective identities of such users, other port modules of the network entry device (e.g., port modules 1512 and 1513) may be configured as such. Further other components of the network entry device 1504 or components (e.g., a firewall) of other devices of the network may be configured as such.

Further, it should be understood that system 1500 may be operative to configure individual virtual ports of a port module according to an identity of a user, for example, if the physical port of the port module is connected to multiple user devices by a shared, wireless transmission medium. Thus, multiple virtual ports of a port module may be configured differently, and may be configured according to different user identities.

Virtual ports may be used by a wireless switching device that aggregates and provides connectivity to the communications network for a plurality of mobile user devices. For example, network entry device 1504 may be a wireless switching device. A wireless switching device may include a wireless access module (e.g., a transceiver) and a switching module (e.g., an Ethernet router). The wireless access module may be configured to apply radio-based protocols (e.g., RF protocols) to transmit, receive, modulate, demodulate, multiplex, de-multiplex and authenticate wireless transmissions to/from user devices. Such wireless access module, possibly in combination with the switching module may build a virtual port for each communication channel, where each communication channel corresponds to a user transmitting/receiving at a particular predefined frequency (or a plurality of frequencies in sequence in accordance with a code division multiplexing scheme) during certain pre-defined timeslots. Thus each virtual port may be dedicated to a particular user and user device, and methods 1300 and 1400 may be performed for each virtual port.

Network entry device 1504 may include entry port module 1510, port modules 1512 and 1513, port connecting medium 1511 and rule database 1514. Network entry device 1504 may be any of a plurality of types of switching devices, for example, one of the Matrix family of switches available from Enterasys Networks, Inc.

The port connecting medium 1511 may be any of a variety of types of port connecting media, and the type may depend on a number of factors, including the number of port-modules included in network entry device 1504. For example, if network entry device 1504 only includes two port modules, then the port connecting medium 154 may be as simple as a transmission medium, for example, a wire or a bus. On the other hand, if the network entry device includes several port modules, then the port connecting medium 1511 may be a more complex medium such as a high-speed switch fabric.

Rule database 1514 may include a plurality of rule sets 1518, which may be indexed using a role identifier 1517 (and/or a service abstraction identifier—not shown). The storage of the rule sets 1518 and rule database 1514 may result from Act 1304 of method 1300 described above in relation to FIG. 13A. As described above, although a relationship hierarchy may have at least three levels, including packet rules, roles and service abstractions, a network entry device or other device of a network may not be configured with service abstractions, as such devices may only be concerned with the packet rules associated with a role.

Alternatively, rule database 1514 may include one or more service abstractions, one or more roles and/or one or more relationship hierarchies, each of which is described above in relation to FIG. 4.

Entry port module 1510 may be connected to a single device of a user by a dedicated transmission medium or may be connected to multiple user devices by a shared transmission medium. Further, entry port module 1510 may be directly-coupled to one or more user devices and may be connected to one or more user devices through one or more switching devices and multiple transmission media.

Entry port module 1510 may include an entry port 1515 and port processing logic 1516. Port processing logic 1516 may include switching logic, memory, and one or more processors (not shown) for configuring the port module and for processing packets sent to and received at the port module. Port processing logic 1516 may be divided into one or more virtual ports (not shown), each virtual port corresponding to a communication channel of the entry port 1515 (e.g., if entry port 1515 is connected to a shared wireless transmission medium). Port processing logic 1516 may include separate switching logic, memory and processors for each virtual port or may share such components between one or more virtual ports. Further, the switching logic, memory and processors of port processing logic 1516 may be shared with port processing logic of other port modules (e.g., 1512 and 1513).

Entry port 1515 is the physical component in which packets 1502 are received, and port processing logic 1516 processes packets received at entry port 1515. Port processing logic 1516 may include several logic components (not shown), including: authentication logic to assist in authenticating a user, identification logic to determine the identity of a user device from which a packet is received, for example, as recited above in relation to Act 1401 of method 1400, port configuration logic for configuring port module 1510, for example, in accordance with the respective identities of one or more users, and rule application logic for applying one or more packet rules to a packet received at entry port 1515.

The port configuration logic may be operative to configure the entry port module 1510 with a state as described above in relation to Act 1301 of method 1300, and to configure the entry port module 1510 with a default role and/or one or more default services and packet rules as described above in relation to Act 1303 of method 1300.

The authentication logic of port processing logic 1516 may be configured such that, if a packet 1502 is received and is a login packet including identification information of a user, the authentication logic controls the forwarding of an authentication request packet 1522 that includes the identification information from the port module 1510 through the port connecting medium 1511 and port module 1512 to authentication module 1506. Such user information may include a user identifier (ID) (i.e., a user name), a password and other user credentials. In an embodiment, for example, when the authentication module 1506 resides on the network entry device 1504, the authentication logic may be integrated as part of the authentication module 1506. Further, the authentication logic may not be included as part of the port processing logic, but may be a separate and distinct component of network entry device 1504.

Authentication module 1506 may be configured to perform authentication in accordance with one or more authentication technologies, for example, RADIUS, a NOS, and IEEE 802.1X. The authentication module 1506 may be configured to access a user authentication entry 1528 of authentication database 1508 using user information 1526, for example, using the user ID. If the authentication module 1506 cannot find an entry 1528 corresponding to the user information 1526, then an authentication response packet 1520 sent from the authentication module to the authentication logic of port processing logic 1516 may indicate that the user is not a valid user of the network.

The authentication module 1506 may be configured such that an entry 1528 is accessed using user information 1526, and entry information 1529 is retrieved. Entry information 1529 may include credential information such as a password and other information, including a role identifier (ID) or one or more service abstraction IDs. The authentication module 1506 may be configured such that if the credential information of entry information 1529 does not match the credential information included in packet 1522, then authentication response packet 1520 may include an indication that the identification information of the user is not valid.

System 1500 may include logic (not shown) for entering entry information in an entry 1528, including assigning logic to assign a role identifier and/or one or more service abstraction identifiers to a user. Such logic may reside on any of one or more network devices of the network on which the system 1500 is implemented, including on network entry device 1504, a user device, or the device on which the authentication module resides. A device on which at least a portion of such logic resides may include a user interface to enable a user to enter the entry information.

The authentication module 1506 may be configured such that if the credential information of packet 1522 matches the credential information of entry information 1529, then authentication response packet 1520 includes the role ID or one or more service abstraction IDs corresponding to the user. Such role ID or one or more service abstraction IDs may have been stored in the entry 1528 corresponding to the user and included in entry information 1529 or may have been stored in another location (e.g., another database) accessed by authentication module 1506.

As described above in relation to Act 1301, one or more port modules of a network entry device may be configured with a state. Accordingly, port configuration logic of port processing logic 1516 may be operative to configure port module 1510 in accordance with one of the states described above in relation to act 1301 if authentication response packet 1520 indicates that authentication of the user has failed and port module 1510 is not already configured with one or more packet rules corresponding to another user. The port configuration logic further may be configured such that, if the authentication response packet 1520 indicates that authentication of the user was successful, and packet 1520 includes a role ID or one or more service abstraction IDs of the user, the port configuration logic selects and extracts a rule set 1518 from rule database 1514 using the role ID 1517 or the one or more service abstraction IDs. As a result, port configuration logic receives rule set 1519 and configures port module 1510 accordingly, for example, as described above in relation to Act 1320 of method 1300.

In an alternative embodiment of network entry device 1504, port module 1510 may already be configured with one or more rule sets 1518, but the rule sets have a disabled status. In response to a successful authentication, the port configuration logic of the port module 1510 may be configured to enable the one or more rule sets associated with the role ID or one or more service abstraction IDs included in authentication response packet 1520.

For each packet received at the entry port module, except login packets, the user identification logic may be configured to identify the user of the user device that transmitted the packet, for example, as described above in relation to act 1401 of method 1400. For example, network entry device may include logic that creates a user identification list as described above in relation to act 1319. Such list may be stored on network entry device 1504 or on any other network element of FIG. 15 accessible by network entry device 1504. The determined user identity dictates the packet rules applied to the received packet by the rule application logic.

The rule application logic of port processing logic 1516 may be configured to apply, in response to receiving a packet 1502 at port module 1510 after a user has been authenticated, the rule set 1519 to the packet 1502. The application of the rule set may be performed as described above in relation to method 1400 of FIGS. 14A and 14B. Thus, the rule application logic may be configured to apply one or more user-based packet rules, one or more default packet rules, and one or more other types of rules to the received packet. It should be noted that multiple rules may specify that a certain value be assigned to a parameter of the received packet that is to be configured. For example, two user-based packet rules, a default packet rule and another type of rule all may specify a different VLAN value to be applied to the received packet. Accordingly, the rule application logic may be configured to give precedence to certain rules over other rules.

The port processing logic 1516 may be configured to forward configured packet 1524 through the port connecting medium 1511 and port module 1513 to another destination on the network, where such packet may be configured and forwarded as described above in relation to methods 1300 and 1400 described above in relation to FIGS. 13A–13C, 14A and 14B.

System 1500, and components thereof, may be implemented, at least in part, as described in *Enterasys User Personalized Network*, referenced above.

System 1500, and components thereof such as 1504, 1506 and 1508, may be implemented using software (e.g., C, C++, Java, or a combination thereof), hardware (e.g., one or more application-specific integrated circuits), firmware (e.g., electrically-programmed memory) or any combination thereof. One or more of the components of system 1500 may reside on a single machine (e.g., a switching device or authentication server), or each component may reside on a different machine. Further, each component may be distributed across multiple machines, and one or more of the machines may be interconnected.

Further, on each of the one or more machines that include one or more components of system 1500, each of the components may reside in one or more locations on the machine. For example, different portions of the components 1510, 1512 and 1513 may reside in different areas of memory (e.g., RAM, ROM, disk, etc.) on the machine. Each of such one or more machines may include, among other components, a plurality of known components such as one or more processors, a memory system, a disk storage system, one or more network interfaces, and one or more busses or other internal communication links interconnecting the various components.

System 1500 is an illustrative embodiment of a system for controlling usage of network resources by a user beyond the user's entry point to a network based on an identity of the user. Such an illustrative embodiment is not intended to limit the scope of the invention, as any of numerous other implementations of such system, for example, variations of system 1500, are possible and are intended to fall within the scope of the invention.

Configuring an entry port module based on an identity of a user, as described above in relation to methods 1300 and 1400 and system 1500 establishes a relationship between a user, an authentication system of a network, and a user's entry point to the network, such that the desired network usage permissions for that user may be dynamically provisioned to the user's entry point.

By leveraging the process of authenticating and authorizing users, which can be implemented using any number of known or later developed technologies, for example, RADIUS, 802.1X, NOS login, Smart cards, Kerberos and biometrics, the identity of a user may be determined, and network usage parameters may be dynamically provisioned to the user's entry point to the network, whether wired, or wireless or a combination thereof. This leveraging allows the authentication process, which historically has provided drive, file, and system level access, to be extended to the edge of the network, which may provide a significant increase in the security, resiliency, and scalability of the network.

Provisioning of such flexible, customizable and granular packet rules, as described above in relation to methods 1300 and 1400 and system 1500, enables the ability to not only secure the access to a holder of the information (e.g., a server), but to the network resources used in accessing the holder of the information (e.g., bandwidth and processing resources on one or more devices). Moreover, such packet rules may be combined to create complex, granular behavioral profiles for users, to enable the timely, secure delivery of business critical information, be it data, voice, or video.

Further, configuring a port module with packet rules according to an authenticated identity of a user allows a user to access a network via any entry port module (appropriately configured as described above) on any network device of the network. Accordingly, the user does not have to be accessing the network at a specific port configured with specific access rules. Nor does the user have to access the network from a specific network address.

Having now described some illustrative embodiments of the invention, it should be apparent to those skilled in the art that the foregoing is merely illustrative and not limiting, having been presented by way of example only. Numerous modifications and other illustrative embodiments are within the scope of one of ordinary skill in the art and are contemplated as falling within the scope of the invention. In particular, although many of the examples presented herein involve specific combinations of method acts or system elements, it should be understood that those acts and those elements may be combined in other ways to accomplish the same objectives. Acts, elements and features discussed only in connection with one embodiment are not intended to be excluded from a similar role in other embodiments. Further, for the one or more means-plus-function limitations recited in the following claims, the means are not intended to be limited to the means disclosed herein for performing the recited function, but are intended to cover in scope any means, known now or later developed, for performing the recited function.

In the claims, all transitional phrases such as "comprising", "including", "carrying", "having", "containing", "involving", and the like are to be understood to be open-ended, i.e. to mean including but not limited to. Only the transitional phrases "consisting of" and "consisting essentially of", respectively, shall be closed or semi-closed transitional phrases as set forth in the United States Patent Office Manual of Patent Examining Procedures, section 2111.03.

Also in the claims, use of ordinal terms such as "first", "second", "third", etc., to modify a claim element do not by themselves connote any priority, precedence, or order of one claim element over another or the temporal order in which acts of a method are performed, but are used merely as labels to distinguish one claim element having a certain name from another element having a same name but for use of the ordinal term to modify the claim elements.

What is claimed is:

1. A method of using a network device of a communications network to control usage of network resources of the communications network by a plurality of users, wherein the network device serves as an entry point to the communications network for the plurality of users and includes a port module, the port module connected by a transmission medium to a first user device used by a first of the plurality of users and located externally to the communications network and the port module connected by the transmission medium to a second user device used by a second of the plurality of users and located externally to the communications network, the method comprising an act of:
   (A-i) providing one or more packet rules to the port module wherein at least a first packet rule of the one or more packet rules is associated with the identity of the first user and at least one of the packet rules is associated with the identity of the second user; and
   (A-ii) configuring the port module with the one or more packet rules to control usage of any of the network resources beyond the port module before use any of the network resources beyond the port module in response to receipt of a packet by the port module from one of the plurality of users.

2. The method of claim 1, further comprising acts of:
   (B) receiving a packet at the port module from a user device;
   (C) determining an identity of a user of the user device; and
   (D) if the determined identity is the identity of the first user, before using any of the network resources beyond the port module in response to processing the packet, applying at least the first packet rule to the packet.

3. The method of claim 2, further comprising an act of:
   (E) if the determined identity is the identity of the second user, before using any of the network resources beyond the port module in response to processing the packet, applying the at least one packet rule to the packet,
   wherein Act (E) is performed concurrently to the first user being logged on to the communications network.

4. The method of claim 2, further comprising:
   (E) repeating acts (C) and (D) for all packets received at the port module from the first user device until the first user logs off of the communications network.

5. The method of claim 1, wherein the at least one packet rule is the first packet rule.

6. The method of claim 1, wherein at least one of the following is true:
   the first packet rule is not associated with the second user and the at least one packet rule is not associated with the first user.

7. The method of claim 1, further comprising:
   (B) prior to act (A-ii), authenticating the identity of at least the first user, wherein the port module is configured with at least the first packet rule in response to the authentication.

8. The method of claim 1, wherein the identity of the first user is associated with a role assigned to the first user, and the role is associated with at least the first packet rule, and wherein the method further comprises:
   selecting the first packet rule based on the role.

9. A network device of a communications network for controlling usage of network resources of the communications network by a plurality of users, wherein the network device serves as an entry point to the communications network for the plurality of users and includes a port module, the port module connected by a transmission medium to a first user device used by a first of the plurality of users and located externally to the communications network and the port module connected by the transmission medium to a second user device used by a second of the plurality of users and located externally to the communications network, the port module comprising:
   port configuration logic to configure the port module with one or more packet rules configuring the port module with the one or more packet rules to control usage of any of the network resources beyond the port module before use any of the network resources beyond the port module in response to receipt of a packet by the port module from one of the plurality of users, wherein at least a first packet rule of the one or more packet rules is associated with the identity of the first user and at least one of the one or more packet rules is associated with the identity of the second user.

10. The network device of claim 9, the port module further comprising:

a physical port to receive a packet from a user device;

user identification logic to determine an identity of a user of the user device; and rule application logic to apply at least the first packet rule to the packet, before using any of the network resources beyond the port module in response to processing the packet, if the determined identity is the identity of the first user.

11. The network device of claim 10, wherein, concurrently to the first user being logged on to the communication network, the rule application logic is further operative to apply the at least one packet rule to the packet, before using any of the network resources beyond the port module in response to processing the packet, if the determined identity is the identity of the second user.

12. The network device of claim 10, wherein the rule application logic is operative to apply the one or more packet rules to all packets received from the device of the first user at the port module until the first user logs off of the communications network.

13. The network device of claim 9, wherein the at least one packet rule is the first packet rule.

14. The network device of claim 9, wherein the port configuration logic is further operative to configure the port module with a plurality of packet rules, and wherein at least one of the following is true:

the at least one packet rule is not associated with the first user and the first packet rule is not associated with the second user.

15. The network device of claim 9, the port module further comprising:

authentication logic to authenticate the identity of at least the first user, wherein the configuration logic is operative to configure the port module in response to the authentication.

16. The network device of claim 9, wherein the identity of the first user is associated with a role assigned to the first user, and the role is associated with at least the first packet rule, and wherein the port configuration logic is operative to select at least the first packet rule based on the role.

17. A network device of a communications network for controlling usage of network resources of the communications network by a plurality of users, wherein the network device serves as an entry point to the communications network for the plurality of use is and includes a port module, the port module connected by a transmission medium to a first user device used by a first of the plurality of users and located externally to the communications network and the port module is connected by the transmission medium to a second user device used by a second of the plurality of users and located externally to the communications network, the network device comprising:

means for providing one or more packet rules associated with an identity of the first user and an identity of the second user, wherein at least a first packet rule of the one or more packet rules is associated with the identity of the first user; and means for configuring the port module with the one or more packet rules to control usage of any of the network resources beyond the port module before use any of the network resources beyond the port module in response to receipt of a packet by the port module from one of the plurality of users.

18. The system of claim 17, further comprising:

means for receiving a packet at the port module from a user device;

means for determining an identity of a user of the user device; and means for applying at least the first packet rule to the packet if the determined identity is the identity of the first user, before using any of the network resources beyond the port module in response to processing the packet.

19. The system of claim 18, further comprising:

means for applying the at least one packet rule to the packet if the determined identity is the identity of the second user, before using any of the network resources beyond the port module in response to processing the packet, wherein applying the least one packet rule to the packet of the second user is performed concurrently to the first user being logged on to the communications network.

20. The system of claim 18, further comprising:

means for determining an identity of a user of the user device and means for applying at least the first packet rule to the packet if the determined identity is the identity of the first user, before using any of the network resources beyond the port module in response to processing the packet for all packets received at the port module from the first user device until the first user logs off of the communications network.

21. The system of claim 17, wherein the at least one packet rule is the first packet rule.

22. The system of claim 17, wherein at least one of the following is true:

the first packet rule is not associated with the second user and the at least one packet rule is not associated with the first user.

23. The system of claim 17, further comprising:

means for authenticating the identity of at least the first user prior to configuring the port module with the one or more rules, wherein the port module is configured with at least the first packet rule in response to the authentication.

24. The system of claim 17, wherein the identity of the first user is associated with a role assigned to the first user, and the role is associated with at least the first packet rule, and the system further comprises: means for selecting the first packet rule based on the role.

25. A computer program product, comprising:

a computer-readable medium; and computer-readable signals stored on the computer-readable medium that define instructions that, as a result of being executed by a computer, instruct the computer to perform a process of using a network device of a communications network to control usage of network resources of the communications network by a plurality of users, wherein the network device serves as an entry point to the communications network for the plurality of users and includes a port module, the port module connected by a transmission medium to a first user device used by a first of the plurality of users and located externally to the communications network and the port module connected by the transmission medium to a second user device used by a second of the plurality of users and located externally to the communications network, the process comprising an act of:

(A) providing one or more packet rules to the port module, wherein at least a first packet rule of the one or more packet rules is associated with the identity of the first user and at least one of the packet rules is associated with the identity of the second user;

(B) configuring the port module with the one or more packet rules to control usage of any of the network resources beyond the port module before use any of the network resources beyond the port module in response to receipt of a packet by the port module from one of the plurality of users.

* * * * *